US006980602B1

(12) United States Patent
Kleinerman et al.

(10) Patent No.: US 6,980,602 B1
(45) Date of Patent: Dec. 27, 2005

(54) NORMALIZATION OF EQUALIZER SOFT OUTPUT FOR CHANNELS WITH VARYING NOISE POWER

(75) Inventors: Alexander Kleinerman, Natania (IL); Ariel Zaltsman, Ra'anana (IL)

(73) Assignee: Comsys Communication & Signal Processing Ltd., Herzelia (IL)

( * ) Notice: Subject to any disclaimer, the term of this patent is extended or adjusted under 35 U.S.C. 154(b) by 998 days.

(21) Appl. No.: 09/773,358

(22) Filed: Jan. 31, 2001

(51) Int. Cl.[7] ............................ H04L 23/12; H04L 5/02
(52) U.S. Cl. ........................ 375/262; 375/259; 375/260; 375/261; 375/297; 375/316; 327/1; 327/100; 455/59; 455/60; 455/137; 714/786; 714/794; 714/795
(58) Field of Search ............................ 375/262, 341, 375/316, 340, 259, 260, 261, 298; 327/1, 327/100; 455/59, 60, 137; 714/786, 794, 714/795

(56) References Cited

U.S. PATENT DOCUMENTS

| 5,457,704 | A |   | 10/1995 | Hoeher et al. ............... 371/43 |
| 5,566,191 | A | * | 10/1996 | Ohnishi et al. ............. 714/794 |
| 5,757,865 | A | * | 5/1998 | Kaku et al. ................. 375/344 |
| 5,844,946 | A | * | 12/1998 | Nagayasu ..................... 375/341 |
| 6,038,696 | A | * | 3/2000 | Chouly et al. .............. 714/786 |
| 6,522,704 | B1 | * | 2/2003 | Hatakeyama .................. 375/340 |
| 6,594,318 | B1 | * | 7/2003 | Sindhushayana ............ 375/262 |
| 6,697,532 | B1 | * | 2/2004 | Demko et al. ............... 382/249 |
| 6,754,291 | B1 | * | 6/2004 | Okanoue et al. ............. 375/341 |
| 6,766,292 | B1 | * | 7/2004 | Chandran et al. ........... 704/224 |
| 6,775,521 | B1 | * | 8/2004 | Chen ........................ 455/67.11 |
| 2001/0005130 | A1 | * | 6/2001 | Manzini et al. ............. 324/71.4 |

OTHER PUBLICATIONS

Khayrallah, A.S., et al., "Improved Channel Estimation With Side Information", IEEE, pp. 1049-1051, 1997.
Boss, Dieter, et al., "Impact of Blind Versus Non-Blind Channel Estimation on the BER Performance of GSM Receivers", IEEE Signal Proceessing Workshop on Higher-Order Statistics, pp. 62-66, Jul. 21-23, 1997.
Mehrotra, Asha, GSM System Engineering, Artech House Inc., 1997, pp. 169-245.
Haykin, Simon, Adaptive Filter Theory, Prentice Hall, 1996, pp. 483-535.
Gerstacker, Wolfgang H. et al., "Iterative Equalization With Adaptive Soft Feedback", IEEE, not dated.

(Continued)

*Primary Examiner*—Stephen Chin
*Assistant Examiner*—Erin File
(74) *Attorney, Agent, or Firm*—Zaretsky & Associates; Howard Zaretsky

(57) ABSTRACT

An apparatus for and method of generating normalized soft decision information output from an inner decoder (i.e. equalizer) in a communications receiver. The invention is operative to normalize the soft decision information before it enters a soft outer decoder. The normalization is performed using a noise power estimate that is dynamically calculated in response to changing noise statistics on the channel. The normalized soft decision output is then applied to the soft outer decoder thus realizing maximum performance therefrom. The noise power estimate is derived from the training sequence and/or the data portion of the received signal. Both types of estimates are calculated. A binary or smoothly weighted average is calculated using both types of estimates. The weighting factor is determined based on one or more performance metrics, such as the Signal to Noise Ratio (SNR).

63 Claims, 9 Drawing Sheets

OTHER PUBLICATIONS

Gerstacker, Wolfgang H. et al., "Improved Equalization for GSM Mobile Communications", IEEE, not dated.

Hafeez, Abdulrauf, et al., "Decision Feedback Sequence Estimation for Unwhitned ISI Channels With Applications to Multiuser Detection"m IEEE Journal of Selected Areas in Communication, vol. 16, No. 9, pp. 1785-1795, Dec. 1998.

Forney Jr., G. David, "The Viterbi Algorithm", pp. 268-178, Nov. 27, 1972.

Berrou, Claude, et al., "A Low Complexity Soft Output Viterbi Decoder Architecture", IEEE, pp. 737-740, Dec., 1993.

Thielecke, John A. "A Soft-Decision State-Space Equalizer for FIR Channels", IEEE Transactions on Communications, vol. 45, No. 10, pp. 1208-1217. Oct. 10, 1997.

Hansson, Ulf et al., "Soft Information Transfer for Sequence Detection With Concatenated Receivers", IEEE Transactions on Communications, vol. 44, No. 9, pp. 1086-1095, Sep. 1996.

Seshadri, N. et al., "On Post-Decision Symbol-Reliability Generation", IEEE, pp. 741-745, Feb. 1993.

Nagayasu, Takayuki, et al., "A Soft-Output Viterbi Equalizer Employing Expanded Memory Length in a Trellis", IEICE Trans. Commun. vol. E80-B, No. 2, pp. 381-385, Feb. 1997.

Park, Jong II, et al., "Trellis-Based Soft-Output Adaptive Equalization Techniques for TDMA Cellular Systems", IEEE Transactions on Vehicular Technology, vol. 49, No. 1, pp. 83-94, Jan. 2000.

Fossorier, Marc P.C., et al., "On The Equivalence Between SOVA and Max-Log-MAP Decodings", IEEE Communications Letters, vol. 2, No. 5, pp. 137-139, May 1998.

Cong, Ling, et al., "On SOVA for Nonbinary Codes", IEEE Communications Letters, vol. 3, No. 12, pp. 335-337, Dec. 1999.

Hagenauer, Joachim et al., "A Viterbi Algorithm with Soft-Decision Outputs and its Applications", IEEE, pp. 1680-1686, 1989.

Li, Yunixin, et al., "Optimum Soft-Output Detection for Channels with Intersymbol Interference", IEEE Transactions on Information Theory, vol. 41, No. 3, pp. 704-713, May 1995.

Proakis, John G. Digital Communications, McGraw-Hill, 1989, pp. 602-643.

Han, Youngyearl, "On The Minimization of Overhead in Channel Impulse Response Measurement" IEEE Transactions on Vehicular Technology, vol. 47, No. 2, pp. 631-636, May 1998.

Rahnema, Moe et al., "Optimum Soft Decision Decoding With Channel State Information in the Presence of Fading", IEEE Communications Magazine, pp. 110-111, Jul. 1997.

* cited by examiner

NORMALIZATION OF EQUALIZER SOFT OUTPUT FOR CHANNELS WITH VARYING NOISE POWER

CROSS REFERENCE TO RELATED APPLICATION

The subject matter of the present application is related to and may be advantageously combined with the subject matter of copending and commonly owned application U.S. patent application Ser. No. 09/616,161, to Yakhnick et al, filed Jul. 14, 2000, entitled "Method of Channel Order Selection and Channel Order Estimation in a Wireless Communication System," incorporated herein by reference in its entirety.

FIELD OF THE INVENTION

The present invention relates generally to communication systems and more particularly relates to an apparatus for and a method of normalizing equalizer soft output for channels with varying noise power.

BACKGROUND OF THE INVENTION

In recent years, the world has witnessed explosive growth in the demand for wireless communications and it is predicted that this demand will increase in the future. There are already over 500 million users that subscribe to cellular telephone services and the number is continually increasing. Eventually, in the not too distant future, the number of cellular subscribers will exceed the number of fixed line telephone installations. Already, in many cases, the revenues from mobile services already exceeds that for fixed line services even though the amount of traffic generated through mobile phones is much less than in fixed networks.

Other related wireless technologies have experienced growth similar to that of cellular. For example, cordless telephony, two way radio trunking systems, paging (one way and two way), messaging, wireless local area networks (WLANs) and wireless local loops (WLLs). In addition, new broadband communication schemes are rapidly being deployed to provide users with increased bandwidth and faster access to the Internet. Broadband services such as xDSL, short range high speed wireless connections, high rate satellite downlink (and the uplink in some cases) are being offered to users in more and more locations.

In connection with cellular services, the majority of users currently subscribe to digital cellular networks. Almost all new cellular handsets sold to customers are based on digital technology, typically second generation digital technology. Currently, third generation digital networks are being designed and tested which will be able to support data packet networks and much higher data rates. The first generation analog systems comprise the well known protocols AMPS, TACS, etc. The digital systems comprise GSM, GERAN, TDMA (IS-136) or CDMA (IS-95), for example.

A diagram illustrating an example prior art communication system employing an inner and outer encoder in the transmitter, inner and outer decoding stages in the receiver and a noise source after the channel is shown in FIG. 1. The communication system, generally referenced 10, represents the typical scheme that may be used in many of the communication services described above. In such a system, the transmitter 12 comprises an encoder 14, symbol generator 16 and modulator 18. Input data bits to be transmitted are input to the encoder 14, which may comprise an error correction encoder such as a Reed Solomon encoder, a convolutional encoder, a parity bit generator, etc. The encoder functions to add redundancy bits to enable errors in transmission to be located and fixed.

It is noted that both the inner and outer decoders in the receiver have complementary encoders in the transmitter. The outer encoder in the transmitter comprises the encoder 14, e.g., Reed Solomon, etc. The inner encoder comprises the channel 20 which often times can be modeled as an L-symbol long FIR-type channel.

The bits output of the encoder are then mapped to symbols by the symbol generator 16. The symbol generator functions to transform the bits to modulator symbols. For example, an 8-PSK modulator converts input bits into one of eight symbols. Thus, the symbol generator generates a symbol for every three input bits.

The output from the mapper is input to the modulator which receives symbols in the M-ary alphabet and generates the analog signal that is subsequently transmitted over the channel 20. The channel may comprise a mobile wireless channel, e.g., cellular, cordless, a fixed wireless channel, e.g., satellite, or may comprise a wired channel, e.g., xDSL, ISDN, Ethernet, etc. The processing performed in the transmitter is intended to generate a signal that can be transmitted over the channel so as to provide robust, error free detection by the receiver.

At the receiver 30, the analog signal from the channel is input to front end circuitry 32 which demodulates and samples the received signal to generate received samples $y(k)$ 40. The symbols are first input to an inner decoder 34. An example of an inner decoder is an equalizer which compensates for the ISI caused by the delay and time spreading of the channel. Examples of commonly used types of equalizers include the maximum likelihood sequence estimation (MLSE) equalizer that utilize the well known Viterbi Algorithm (VA), linear equalizer and decision feedback equalizer (DFE). The equalizer attempts to the detect the symbols that were originally transmitted by the modulator.

In the typical wireless receiver, the inner decoder generates its output using an estimate of the channel. The channel estimation module 38 is operative to generate a channel estimate represented by $\tilde{h}(k)$ that is used by the inner decoder 34. The channel estimation is generated using the received input samples $y(k)$ 40, the ideal training sequence and the received training sequence.

The output of the inner decoder comprises symbols $s(k)$ 42 which represent hard decisions. The hard decisions are then input to an outer decoder 36 which functions to locate and fix errors using the redundancy inserted by the encoder. The outer decoder generates the binary receive data $A(k)$ 44.

An example of an outer decoder is a convolutional decoder that utilizes the Viterbi Algorithm. The Viterbi Algorithm is widely used in communication systems and has been adapted to perform functions including demodulation, decoding, equalization, etc. Many systems utilize the Viterbi Algorithm in both the inner and outer decoding stages.

For example, consider a receiver adapted to receive a GSM or GERAN signal. Such a system utilizes convolutional coding for performing Forward Error Correction (FEC) over channels that require equalization. The equalizer and outer FEC decoder typically used employ the Viterbi Algorithm in their operation.

There exists a class of decoders that provide improved performance by utilizing soft information about the received symbols rather than only hard decisions. Examples include turbo decoders and soft decision convolutional forward error correction decoders utilizing the Viterbi Algorithm, etc. The advantage of a Viterbi decoder is that it can efficiently process of decision information. This class of decoders provides better performance by taking into account soft information about the reliability of the received symbol. The improved performance of the decoder cannot be realized, however, when soft information about the received symbols is not available.

The technique of equalization is a commonly used method of improving performance with channels exhibiting inter symbol interference. Equalizers such as those described above are adapted to output hard decisions. In the case where an optimal decoder is to be used, soft bit decisions rather than hard bit decisions are required (where a hard bit decision is a bit value (0 or 1) and a soft decision consists of a bit value and the decision reliability). In this case the equalizer is adapted to generate soft outputs, namely it produces soft symbol decisions.

In order to enable accurate and reliable computation of decision reliability based on the equalizer output metric, it is desirable that the soft decisions input to the soft outer decoder be normalized to the same mean noise power σ. Using non-normalized soft decisions negatively affects the overall performance of the receiver.

Note that in systems where the noise statistic does not vary with time, receiver performance may not be affected much if non-normalized soft decisions are used. In most real world communication systems, however, the noise variance varies with time and cannot be assumed constant. In such communication systems, receiver performance can be significantly improved if the variation in noise statistic is factored into the determination of the soft decisions.

SUMMARY OF THE INVENTION

The present invention provides a novel and useful apparatus for and method of generating normalized soft decision information output from an inner decoder (i.e. equalizer) in a communications receiver that overcomes the disadvantages of the prior art. The present invention is suitable for use with a wide range of communication systems and is particularly useful in receivers that comprise concatenated coding schemes whereby a soft outer decoder is used to process the soft decision information generated by the inner decoder.

The present invention has applications in any type of receiver whereby soft decision information generated is to be subsequently processed by an outer decoder. The invention is operative to normalize the soft decision information before it enters the soft outer decoder. The normalization is performed using a noise power estimate that is dynamically calculated in response to changing noise statistics on the channel. The normalized soft decision output can then be applied to the soft outer decoder thus realizing maximum performance therefrom.

The invention is operative to derive a noise power estimate from the training sequence and/or the data portion of the received signal. In one embodiment, both are calculated but only one is used depending on the state of one or more performance metrics. In another embodiment, both are combined in a weighted average.

The invention is operative to provide the soft outer decoder with samples having the same mean power of noise. The noise power level is measured during a short time period where the noise power can be assumed to be constant, e.g., during the burst in cellular TDMA systems as well as GSM and IS-136 systems. The received signal is then normalized in such a way that the noise power between burst to burst of the bits entering the decoder is the same.

A key feature of the present invention is that the noise variance is used in computing soft output values, thus resulting in better overall performance of the receiver. In many real world systems, the noise statistic varies with time and cannot be assumed to be constant. The present invention thus provides a mechanism to estimate the noise power and use it to normalize soft decision information subsequently input to the soft decision based outer decoder. It is noted that the present invention performs the normalization process using a relatively low complexity technique.

The invention can be implemented in either hardware or software. In one embodiment, noise power estimates are generated from the training sequence and from the data itself. The two noise power estimates are then processed by a noise power function to generate a final noise power estimate. This final noise power estimate is then used to normalize the soft decision information before it is input to the outer decoder.

In another embodiment, a computer comprising a processor, memory, etc. is operative to execute software adapted to perform the soft output normalization method of the present invention.

There is thus provided in accordance with the present invention a method of normalizing soft decisions obtained from an M-ary signal transmitted over a communications channel and subsequently input to an outer decoder, the method comprising the steps of generating a first noise estimate based on a training sequence transmitted along with data over the communications channel, generating a second noise power estimate derived from the data transmitted over the channel, generating at least one performance based metric based on the reception of the training sequence or on the reception of the data, calculating a combined noise power estimate as a function of the first noise power estimate, the second noise power estimation and the at least one metric and modifying the soft decisions in accordance with the combined noise power estimate so as to yield normalized soft decisions, the normalized soft decisions subsequently input to the outer decoder.

There is also provided in accordance with the present invention a method of normalizing soft decisions obtained from an M-ary signal transmitted over a communications channel and subsequently input to an outer decoder, the method comprising the steps of generating a first noise power estimate based on a training sequence transmitted along with data over the communications channel, generating a second noise power estimate derived from the data transmitted over the channel, generating at least one performance based metric based on the reception of the training sequence or on the reception of the data, calculating a combined noise power estimate solely as a function of the first noise power estimate when the at least one performance metric indicates the first noise power estimate has smaller estimation variance over the second noise power estimate, calculating the combined noise power estimate solely as a function of the second noise power estimate when the at least one performances metric indicates the second noise power estimate has smaller estimation variance over the first noise power estimate, modifying the soft decisions in accordance with the combined noise power estimate so as to yield normalized soft decisions, the normalized soft decisions subsequently input to the outer decoder.

There is further provided in accordance with the present invention a method of normalizing soft decisions obtained from an M-ary signal transmitted over a communications channel and subsequently input to an outer decoder, the method comprising the steps of generating a first noise power estimate based on a training sequence transmitted along with data over the communications channel, generating a second noise power estimate derived from the data transmitted over the channel, generating at least one performance based metric based on the reception of the training sequence or on the reception of the data, calculating a combined noise power estimate as a weighted function of the first noise power estimate and the second noise power estimate, modifying the soft decisions in accordance with the combined noise power estimate so as to yield normalized soft decisions, the normalized soft decisions subsequently input to the outer decoder.

There is also provided in accordance with the present invention a communication receiver for receiving and decoding an M-ary transmitted signal comprising a radio frequency (RF) front end circuit for receiving and converting the M-ary transmitted signal to a baseband signal, a demodulator adapted to receive the baseband signal and so generate a received signal therefrom in accordance with the M-ary modulation scheme used to generate the transmitted signal, a first decoder operative to receive the received signal and to generate a sequence of soft symbol decisions therefrom, a normalization mechanism comprising processing means programmed to generate a first noise power estimate based on a training sequence transmitted along with data over the communications channel, generate a second noise power estimate derived from the data transmitted over the channel, generate at least one performance based metric based on the reception of the training sequence or on the reception of the data, calculate a combined noise power estimate as a function of the first noise power estimate, the second noise power estimation and at least one metric, modify the soft decisions in accordance with the combined noise power estimate so as to yield normalized soft decisions and a second decoder adapted to receive the normalized soft decisions and to generate binary received data therefrom.

There is still further provided in accordance with the present invention a computer readable storage medium having a computer program embodied thereon for causing a suitably programmed system to normalize soft decisions output by an inner decoder by performing the following steps when such program is executed on the system generating a first noise power estimate based on a training sequence transmitted along with data over the communications channel, generating a second noise power estimate derived from the data transmitted over the channel, generating at least one performance based metric based on the reception of the training sequence or on the reception of the data, calculating a combined noise power estimate as a function of the first noise power estimate, the second noise power estimation and the at least one metric and modifying the soft decisions in accordance with the combined noise power estimate so as to yield normalized soft decisions, the normalized soft decisions subsequently input to the outer decoder.

BRIEF DESCRIPTION OF THE DRAWINGS

The invention is herein described, by way of example only, with reference to the accompanying drawings, wherein.

DETAILED DESCRIPTION OF THE INVENTION

Notation Usted Throughout

The following notation is used throughout this document.

| Term | Definition |
| --- | --- |
| AMPS | Advanced Mobile Phone System |
| ASIC | Application Specific Integrated Circuit |
| BER | Bit Error Rate |
| BLER | Block Error Rate |
| C/I | Carrier to Interferer ratio |
| CDMA | Code Division Multiple Access |
| CPU | Central Processing Unit |
| DFE | Decision Feedback Equalizer |
| DSL | Digital Subscriber Line |
| DSP | Digital Signal Processor |
| EDGE | Enhanced Data rates for GSM and TDMA/136 Evolution |
| EEROM | Electrically Erasable Read Only Memory |
| EGPRS | Enhanced General Packet Radio System |
| FEC | Forward Error Correction |
| FIR | Finite Impulse Response |
| FPGA | Field Programmable Gate Array |
| GERAN | GSM EDGE Radio Access Network |
| GMSK | Gaussian Minimum Shift Keying |
| GSM | Global System for Mobile Communication |
| IEEE | Institute of Electrical and Electronics Engineers |
| ISDN | Integrated Services Digital Network |
| ISI | Intersymbol Interference |
| MAP | Maximum A Posteriori |
| MCS | Modulation Coding Scheme |
| MLSE | Maximum Likelihood Sequence Estimation |

-continued

| Term | Definition |
| --- | --- |
| PSK | Phase Shift Keying |
| RAM | Random Access Memory |
| ROM | Read Only Memory |
| SNR | Signal to Noise Ratio |
| SOVA | Soft Output Viterbi Algorithm |
| TACS | Total Access Communications Systems |
| TDMA | Time Division Multiple Access |
| VA | Viterbi Algorithm |
| WLAN | Wireless Local Area Network |
| WLL | Wireless Local Loop |

DETAILED DESCRIPTION OF THE INVENTION

The present invention is an apparatus for and a method of normalizing equalizer soft output for channels with varying noise power. The present invention is suitable for use with a wide range of communication systems and is particularly useful in receivers that comprise concatenated coding schemes whereby the outer decoder receives soft decision information. The overall performance of the receiver is greatly improved when normalized rather than non-normalized soft decision information is provided to the soft outer decoder. The soft decision information is normalized using a noise power estimate derived from the data, the training sequence or a combination of the two.

The present invention provides a communications receiver adapted to track the time varying noise characteristics of the channel and to dynamically determine a noise power estimate based thereon. The noise estimate is used to normalize the soft decision output from the equalizer. The normalized soft decision output is subsequently input to the soft outer decoder.

Figure 1:
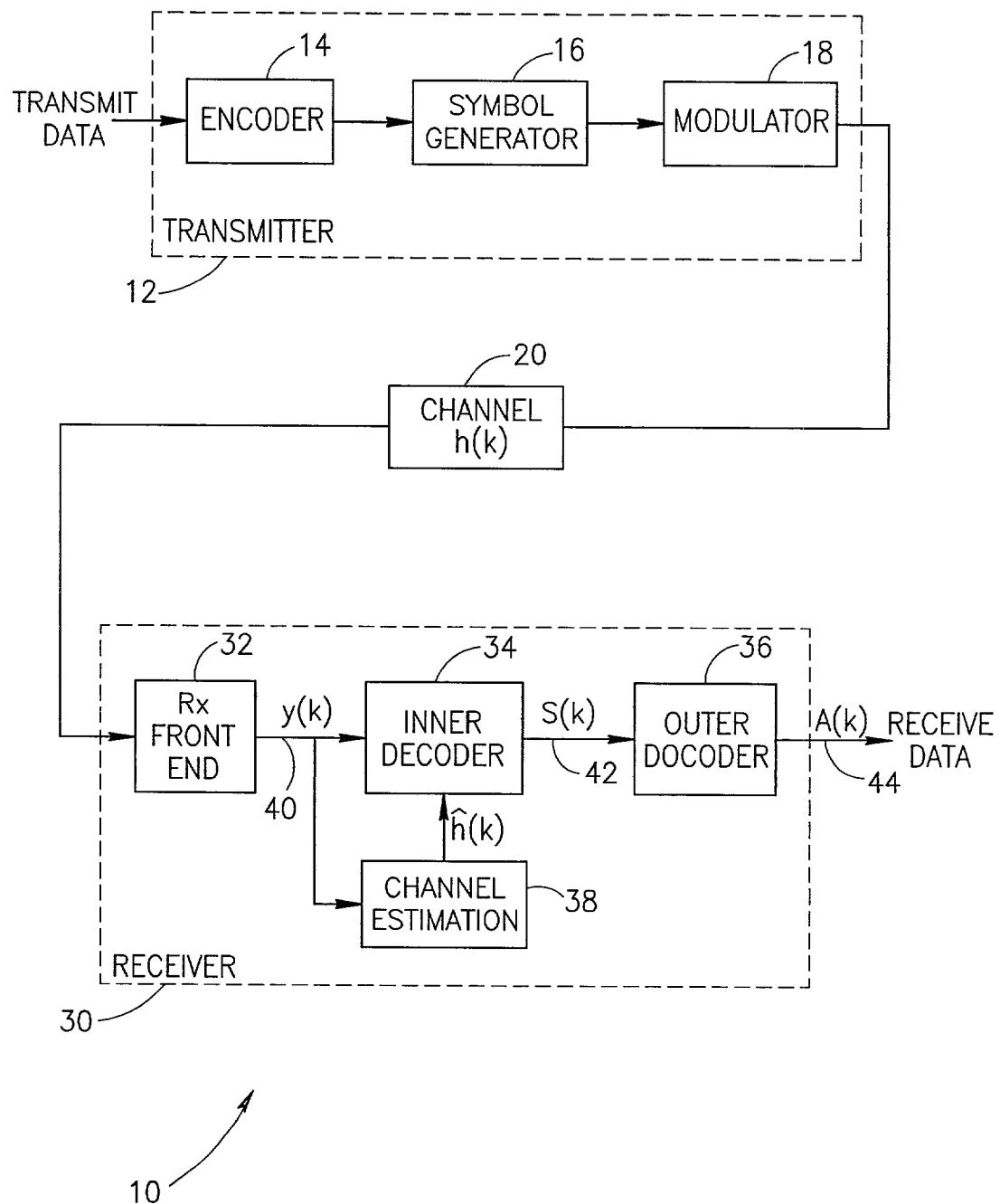
FIG. 1 is a diagram illustrating an example prior art communication system employing an inner and outer encoder in the transmitter, inner and outer decoding stages in the receiver and a noise source added to the channel.
Figure 2:
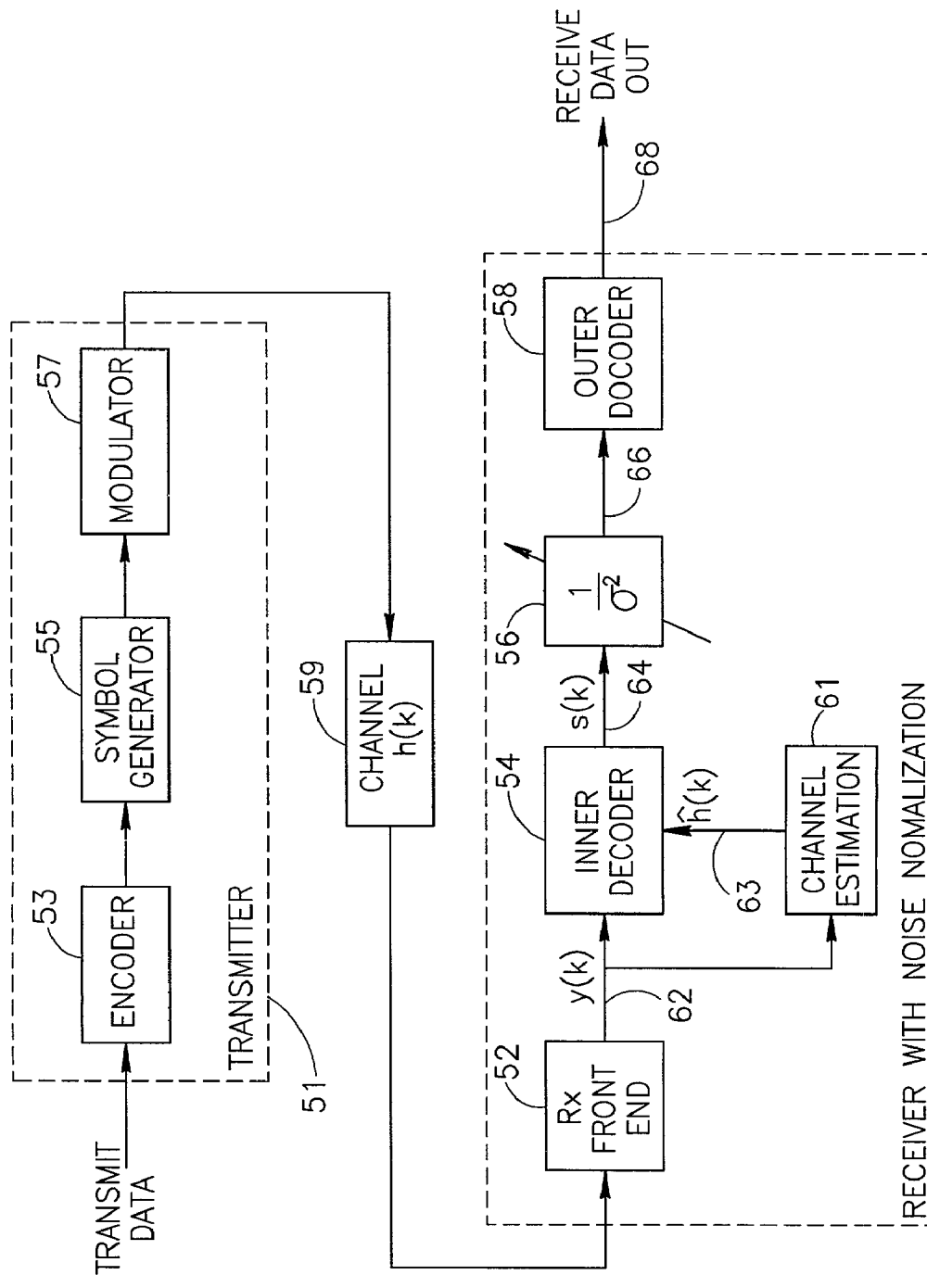
FIG. 2 is a block diagram illustrating a concatenated receiver incorporating the dynamic normalization function of the present invention.

A block diagram illustrating a concatenated receiver incorporating the dynamic normalization function of the present invention is shown in FIG. 2. The communication system, generally referenced 50, comprises a concatenated encoder transmitter 51 coupled to a channel 59, and a concatenated decoder receiver 60. The transmitter 51 comprises an encoder 53, bit to symbol mapper 55 and modulator 57. Input data bits to be transmitted are input to the encoder 53 which may comprise an error correction encoder such as Reed Solomon, convolutional encoder, parity bit generator, etc. The encoder functions to add redundancy bits to enable errors in transmission to be located and fixed.

The bits output of the encoder 53 are then mapped to symbols by the symbol mapper 55. The bit to symbol mapper functions to transform bits to modulator symbols from an M-ary alphabet. For example, an 8-PSK modulator converts input bits into one of eight symbols. Thus, the mapper generates a symbol for every three input bits.

The symbols outputs from the mapper are input to the modulator 57 which functions to receive symbols in the M-ary alphabet and to generate the analog signal therefrom that is subsequently transmitted over the channel 59. The channel may comprise a mobile wireless channel, e.g., cellular, cordless, fixed wireless channel, e.g., satellite, or may comprise a wired channel, e.g., xDSL, ISDN, Ethernet, etc. It is assumed that noise is present and added to the signal in the channel. The transmitter is adapted to generate a signal that can be transmitted over the channel so as to provide robust, error free detection by the receiver.

It is noted that both the inner and outer decoders in the receiver have complimentary encoders in the transmitter. The outer encoder in the transmitter comprises the encoder 53, e.g., Reed Solomon, etc. The inner encoder comprises the channel 59 which, in one embodiment, can be modeled as an L-symbol long FIR-type channel.

At the receiver 60, the analog signal from the channel is input to Rx front end circuitry 52 which demodulates and samples the received signal to generate received samples y(k) 62. The symbols are then input to an inner decoder 54 and a channel estimation 61. An example of an inner decoder is an equalizer which compensates for the ISI caused by the delay and time spreading of the channel.

The channel estimation 61 is operative to generate a channel estimate 63 represented by $\hat{h}(k)$ that is used by the inner decoder 54 (i.e. equalizer). The channel estimation is generated using the received input samples y(k) 62, the ideal training sequence of $S_{TRN}(k)$ and the received training sequence y(k).

Several methods of channel estimation that are known in the art and suitable for use with the present invention include, for example, a correlation method and a least squares method. The correlation method is described in detail in "GSM System Engineering," A. Mehrotra, 1997, Chapter 6 and in the article "On the Minimization of Overhead in Channel Impulse Response Measurement," Y. Han, IEEE Transactions on Vehicular Technology, Vol. 47, No. 2, May 1998, pages 631–636. The least square method of channel estimation is described in more detail in the articles "Improved Channel Estimation With Side Information," A. S. Khayrallah, R. Ramesh, G. E. Bottomley, D. Koilpillai, IEEE, March 1997, pages 1049–1051 and "Impact of Blind versus Non-Blind Channel Estimation on the BER performance of GSM Receivers," D. Boss. T. Petermann, K. Kammeyer, IEEE Signal Processing Workshop on Higher-Order Statistics, Jul. 21, 1997, pages 62–67 and in the book "Adaptive Filter Theory," S. Haykin, 1996, Chapter 11 (Method of Least Squares).

Another channel estimation technique suitable for use with the present invention is described in U.S. patent application Ser. No. 09/616,161, to Yakhnich et al., filed Jul. 14, 2000, entitled "Method of Channel Order Selection and Channel Order Estimation in a Wireless Communication System," similarly assigned and incorporated herein by reference in its entirety.

Equalization is a well known technique used to combat intersymbol interference whereby the receiver attempts to compensate for the effects of the channel on the transmitted symbols. Thus, the function of the equalizer is to attempt to detect the symbols that were originally transmitted by the modulator. Equalizers may be linear or nonlinear, may generate hard decisions or may generate soft decisions.

Note that a hard decision is one of the possible values a symbol s(k) can take. In the ideal case, a soft decision comprises the reliabilities of each possible symbol value. The soft decision comprises a complete information packet that is needed by the decoder. An information packet is defined as the output generated by a detector or decoder in a single operation. (See "Optimum Soft-Output detection for Channels with Intersymbol Interference," Y. Li, B. Vucetic, Y. Sato, IEEE Trans. on Inform. Theory, Vol. 41, No. 3, May 1995).

Examples of hard decision equalizers include the maximum likelihood sequence estimation (MLSE) equalizer that utilizes the well known Viterbi Algorithm (VA), linear equalizer and decision feedback equalizer (DFE). An equalizer attempts to determine the transmitted data from the received distorted symbols using an estimate of the channel that caused the distortions. In communications systems where ISI arises due to partial response modulation or a frequency selective channel, a maximum likelihood sequence estimation (MLSE) equalizer is optimal. This is the form of equalizer generally used in GSM and GERAN systems.

The MLSE technique is a nonlinear equalization technique which is applicable when the radio channel can be modeled as a Finite Impulse Response (FIR) system. Such a FIR system requires knowledge of the channel impulse response tap values. The channel estimate is obtained using a known training symbol sequence to estimate the channel impulse response. Other equalization techniques such as DFE or linear equalization require precise knowledge of channel.

Several well known techniques can be used to provide soft symbol decisions from the inner decoder (or equalizer) that can then be used by a soft decoder. Most of these soft output equalization techniques are based on maximum likelihood sequence estimation (MLSE) or computational complex methods such as maximum a posteriori (MAP) algorithms. A few of these techniques are described below.

One technique uses an optimum soft output algorithm derived under the constraint of fixed decision delay for detection of M-ary signals in the presence of ISI and additive white Gaussian noise, as described in "Optimum Soft-Output Detection for Channels with Intersymbol Interference," Y. Le, B. Vucetic, Y. Sato, IEEE Trans. on Inform. Theory, Vol. 41, No. 3, May 1995, incorporated herein by reference in its entirety. This technique is a type of symbol by symbol maximum a posteriori (MAP) probability algorithm which functions to reduce the memory and computation requirements of the MAP algorithm.

An extension of the Viterbi Algorithm is described in "A Viterbi Algorithm with Soft-Decision Outputs and its Applications," J. Hagenauer and P. Hoeher, Prc. GLOBCOM '89 (Dallas, Tex.), Nov. 1989, Vol. 3, pages 47.1.1–47.1.17, incorporated herein by reference in its entirety. In addition to the most likely path sequence, the algorithm provides either a posteriori probability of each symbol or a reliability value. From this, the soft decisions are generated to be used in decoding of outer codes. The inner soft output Viterbi Algorithm (SOVA) accepts and delivers soft sample values.

A SOVA algorithm for non-binary codes that is equivalent to the Max-Log MAP algorithm has been developed and described in "On SOVA for Nonbinary Codes," L. Cong, W. Xiaofu and Y. Xiaoxin, IEEE Comm. Letters, Vol. 3, No. 12, December 1999, incorporated herein by reference in its entirety. Viterbi-type recursions are used to update the reliability measures associated with the SOVA.

In addition, a description of a method for providing a reliability information for each decoded data symbol at the output of an arbitrary decoder can be found in U.S. Pat. No. 5,457,704, issued to Hoeher et al., incorporated herein by reference in its entirety. The reliability information is generated by comparing the decoded sequence to a small list of alternative sequences which differ at least in the symbol for which the reliability is being sought.

For purposes of this description, it is assumed that soft decisions s(k) 64 are available from the output of the inner decoder 54 (i.e. the equalizer). In the case that a hard decision equalizer is employed, it is assumed a soft output generator is used to generate soft decisions. A soft output generator suitable for use with the present invention is described in U.S. Pat. No. 6,731,700, entitled "Soft Decision Output Generator," incorporated herein by reference in its entirety.

The soft decisions are then input to the normalization module 56 which functions to normalize the soft decisions in accordance with a noise power estimate generated in response to the constantly changing noise statistics of the channel. The noise power estimate is determined using the received data, received training sequence or a combination of both, as described in more detail hereinbelow.

The normalized soft decisions 66 generated by the normalization module 56 are then input to the outer decoder 58 which is preferably an optimal soft decoder. The soft outer decoder functions to locate and fix errors using the redundancy bits inserted by the encoder. The outer decoder 58 generates the binary receive data 68. Examples of the other decoder 58 include convolutional decoders utilizing the Viterbi Algorithm, convolutional Forward Error Correction (FEC) decoders, turbo decoders, etc. Soft input Viterbi decoders have the advantage of efficiently processing soft decision information and providing optimum performance in the sense of minimum sequence error probability.

Note that optionally, an interleaver/de-interleaver may be added to the system. In this case, a symbol based interleaver/de-interleaver is used. If a bit based interleaver/de-interleaver is used, some mechanism of mapping soft symbols to bits must be used before the outer decoder. A mechanism of mapping soft symbols to bits suitable for use with the present invention is described in detail in U.S. Publication No. US 2002/0122510 A1, entitled "Apparatus For And Method of Converting Soft Symbol Information To Soft Bit Information," incorporated here by reference in its entirety.

The normalization mechanism of the present invention may be used with a variety of different types of receivers. The present invention can be used to normalize the output of various types of inner decoders, several examples of which are presented below.

Figure 3:
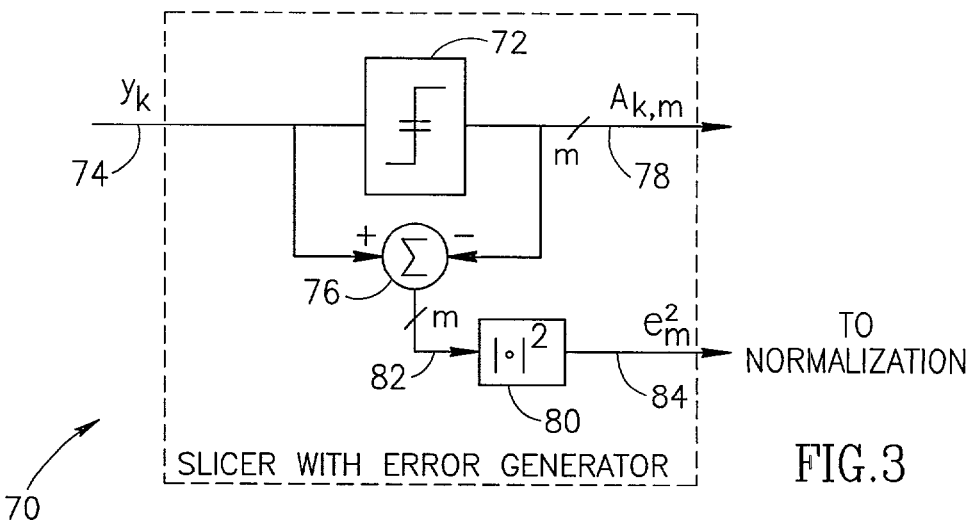
FIG. 3 is a block diagram illustrating an example of a slicer that may be used with the dynamic normalization function of the present invention.

A block diagram illustrating an example of a slicer that may be used with the dynamic normalization function of the present invention is shown in FIG. 3. In this example application, the slicer circuit, generally referenced 70, is used to generate the soft symbol decision information 84 input to the normalization module of the present invention. The input $y_k$ (i.e. received symbols) 74 is input to the symbol by symbol slicer 72. The slicer, a decision device, is operative to determine the symbol in the constellation closest to the received symbol, as represented by $A_{k,m}$ 78 where 'm' represents the number of symbols in the constellation, e.g., $m \in \{1, 2, \ldots 8\}$ in the case of 8-PSK. The output $A_{k,m}$ represents the hard decision as determined by the slicer.

Both the received symbol $y_k$ 74 and the sliced output $A_{k,m}$ 78 are input to an adder 76 which functions to calculate the difference between the two, for each of the possible symbol values. The difference values represent the Euclidean distance between the received symbol and each of the symbols in the constellation. The absolute value squared of each of the 'm' differences 82 are then calculated by function block 80. The resulting error values $e_m^2$ 84 represent the soft decision information and are subsequently normalized in accordance with the noise power estimate before being input to the soft decoder (e.g., convolutional Viterbi decoder).

Figure 4:
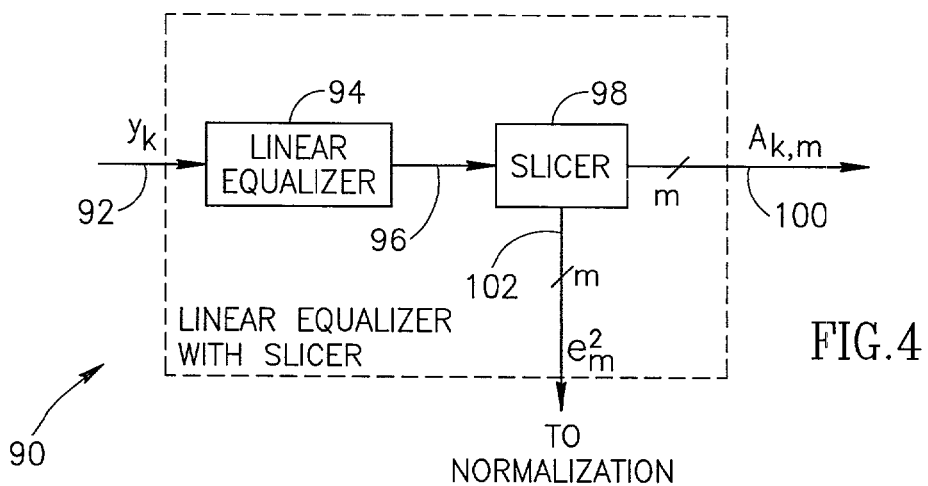
FIG. 4 is a block diagram illustrating an example of a slicer coupled to the output of a linear equalizer that may be used with the dynamic normalization function of the present invention.

A block diagram illustrating an example of a slicer coupled to the output of a linear equalizer that may be used with the dynamic normalization function of the present invention is shown in FIG. 4. In this example application, the linear equalizer circuit, generally referenced 90, functions to generate the input 96 that is used by the slicer 98 to generate the soft symbol decision information 102 input to the normalization module of the present invention. The input $y_k$ (i.e. received symbols) 92 is input to the linear equalizer 94. The slicer 98 determines the symbol in the constellation closest to the received symbol, as represented by $A_{k,m}$ 1000 where 'm' represents the number of symbols in the constellation. The output $A_{k,m}$ represents the hard decision as determined by the slicer.

Both the received symbol $y_k$ 96 and the sliced output $A_{k,m}$ 100 are input to an adder which functions to calculate the difference between the two, for each of the possible symbol values. The absolute value squared of each of the 'm' differences are then calculated. Note that for clarity, the adder and absolute value squared function block are incorporated into the slicer circuit 98. The resulting error values $e_m^2$ 102 represent the soft decision information and is subsequently normalized in accordance with the noise power estimate before being input to the soft decoder (e.g., convolutional Viterbi decoder).

Figure 5:
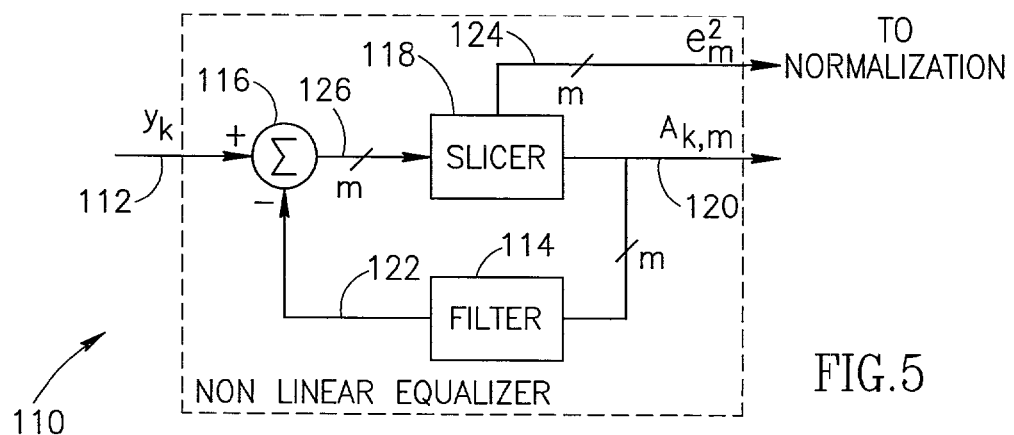
FIG. 5 is a block diagram illustrating an example of a nonlinear equalizer that may be used with the dynamic normalization function of the present invention.

A block diagram illustrating an example of a nonlinear equalizer that may be used with the dynamic normalization function of the present invention is shown in FIG. 5. Alternatively, the slicer circuit of FIG. 4 may be used to construct a nonlinear equalizer, generally referenced 110. The hard decisions $A_{k,m}$ 120 output of the slicer 118 are input to a filter 114 which functions to convolve the m hard decisions with the channel estimate determined by the channel estimation module 61 (FIG. 2). The resulting convolution output 122 is subsequently subtracted from the input $y_k$ (i.e. received symbols) 112 via adder 116 in an effort to remove the intersymbol interference from the received symbol stream. The output 126 of the adder comprises the input to the slicer 118. The slicer determines the symbol in the constellation closest to the received symbol.

The error difference $e_m^2$ 124 is generated from the received symbols with the effect of the intersymbol interference removed 126 and the sliced output $A_{k,m}$ 120. The error values $e_m^2$ represent the soft decision information and are subsequently normalized in accordance with the noise power estimate before being input to the soft decoder (e.g., convolutional Viterbi decoder).

The normalization mechanism of the present invention will now be described in more detail. Note that it is assumed that an M-ary modulation scheme is used, with $M=2^q$ and having the alphabet $$A=\{A_0, A_1, \ldots A_{m-1}\}$$

Each symbol can then be represented by q number of bits. For example, the modulation scheme used in GSM EDGE and GSM EDGE Radio Access Network (GERAN) systems is 8-PSK with q=3.

A channel model is used that assumes the channel has a length L symbols long and comprises a FIR-type channel whose taps can be estimated using a suitable well known estimation technique such as described supra. The invention, however, is applicable to other types of channels as well, and is not limited to FIR type channels. The channel type example described herein is not intended to limit the scope of the invention.

The input samples can be modulated by the following equation $$y_k = \sum_{i=0}^{L-1} h_i * s_{k-i} + n_k \qquad (1)$$

where
  $y_k$ represents the $k^{th}$ input sample input to the inner decoder (i.e. the equalizer);
  $s_{k-1}$ represents the k-$i^{th}$ hard symbol decision;
  $h_2$ represents the channel estimate;
  $n_k$ represents zero mean, additive white Gaussian noise.

In accordance with the present invention, the noise static $n_k$ is factored into the computation of the soft output values, thus resulting in better overall performance of the receiver. In most real world systems, the noise statistic varies with time and cannot be assumed constant, as in the case of GSM and GERAN cellular systems.

Considering the expression for the input sample presented above in Equation 1, the conditional probability of the input sample sequence $y_k, \ldots, y_{k+(L-1)}$ given the hard symbol decision sequence $s_{k-(L-1)}, \ldots s_{k-1}, s_k, s_{k+1}, \ldots, s_{k+(L-1)}$ is given by the following expression $$P(y_k \ldots y_{k+(L-1)} | s_{k-(L-1)} \ldots s_{k+(L-1)}) = \qquad (2)$$
$$\left(\frac{1}{2\pi\sigma^2}\right)^{\frac{L}{2}} \prod_{i=0}^{L-1} \exp\left\{-\frac{\left|y_{k+i} - \sum_{j=0}^{L-1} h_j s_{k+i-j}\right|^2}{2\sigma^2}\right\}$$

where
  k represents the time index;
  m represents the assumed transmitted symbol index;
  L represent the channel length;
  $2\sigma^2$ is a constant representing the noise variance;

Note that in accordance with the present invention, the soft outer decoder is notified of any changes over time of the noise variance. The soft outer decoder requires this information in order to maintain optimal decoding of the received symbols. Therefore, the soft decision information is normalized before it enters the soft outer decoder.

To aid in illustrating the principles of the present invention, consider an alphabet comprising two symbols, i.e. M=2. The symbols comprise $A=\{A_0, A_1\}$ representing one bit per symbol where $b=\{0, 1\}$ respectively. In addition, it is assumed there is no intersymbol interference. In this case, the input samples can be written as $$y_k = h^* A_k + n_k \qquad (3)$$

The conditional probability of $y_k$ given the transmitted bit is expressed as $$P(y_k | b_k) = P(y_k | A_k) = \left(\frac{1}{2\pi\sigma^2}\right)^{\frac{N}{2}} \prod_{i=0}^{L-1} \exp\left\{-\frac{|y_k - hA_k|^2}{2\sigma^2}\right\} \qquad (4)$$

The function of the outer decoder is to find the most probable transmitted bit sequence. In other words, the outer decoder is operative to maximize the likelihood of the following sequence $$P(\underline{y} \mid \underline{b}) = \prod_{k=1}^{N} P(y_k \mid b_k) \quad (5)$$

This can be expressed as $$\mathrm{MAX}[P(\underline{y} \mid A)]_{A_{k,m}} = \mathrm{MAX}\left[\sum_{k=1}^{N} \log\left(\left(\frac{1}{2\pi\sigma^2}\right)^{\frac{N}{2}} \prod_{i=0}^{L-1} \exp\left\{-\frac{|y_k - hA_{k,m}|^2}{2\sigma^2}\right\}\right)\right] \quad (6)$$

where k represents the time index;

m represents the assumed transmitted symbol index;

Typically, the path metric used by the outer decoder (e.g., Viterbi decoder) is given by the following expression $$\text{Path Metric}(k, m) = \frac{|y_k - hA_{k,m}|}{2\sigma^2} \quad (7)$$

This expression for the path metric can be modified and simplified under certain assumptions. The use of this path metric to evaluate competitor bit sequences ensures maximization of Equation 6.

It is important to point out that the path metric presented above represents the Euclidian distance between the received symbol and the transmitted symbol, scaled and divided by the noise variance. The Euclidian distance is provided by a decision device known as a slice, such as described above in connection with FIG. 3. Note that the same expression can be used in the case of a channel with intersymbol interference wherein a linear equalizer and slicer device are used in the receiver.

The use of nonlinear equalization techniques, such as those based on the Viterbi Algorithm or its reduced state mechanisms like Reduced State Sequence Estimation (RSSE) or Decision Feedback Equalization (DFE), provides a Euclidian distance of the kind $$\left| y_k - \sum_i h_i A_{k-i,m} \right|^2 \quad (8)$$

An example of such a nonlinear equalization technique is shown in FIG. 5.

Examining Equations 7 and 8, it is apparent that the path metric is actually the Euclidian distance divided by the noise variance. Note that the output generated by an equalizer is the Euclidian distance without division by the noise power. Therefore, in order to enable optimum operation of the subsequent soft outer decoding stage, the input soft decision information must be normalized (i.e. divided) by the noise power as illustrated in the receiver of FIG. 2.

Figure 6:
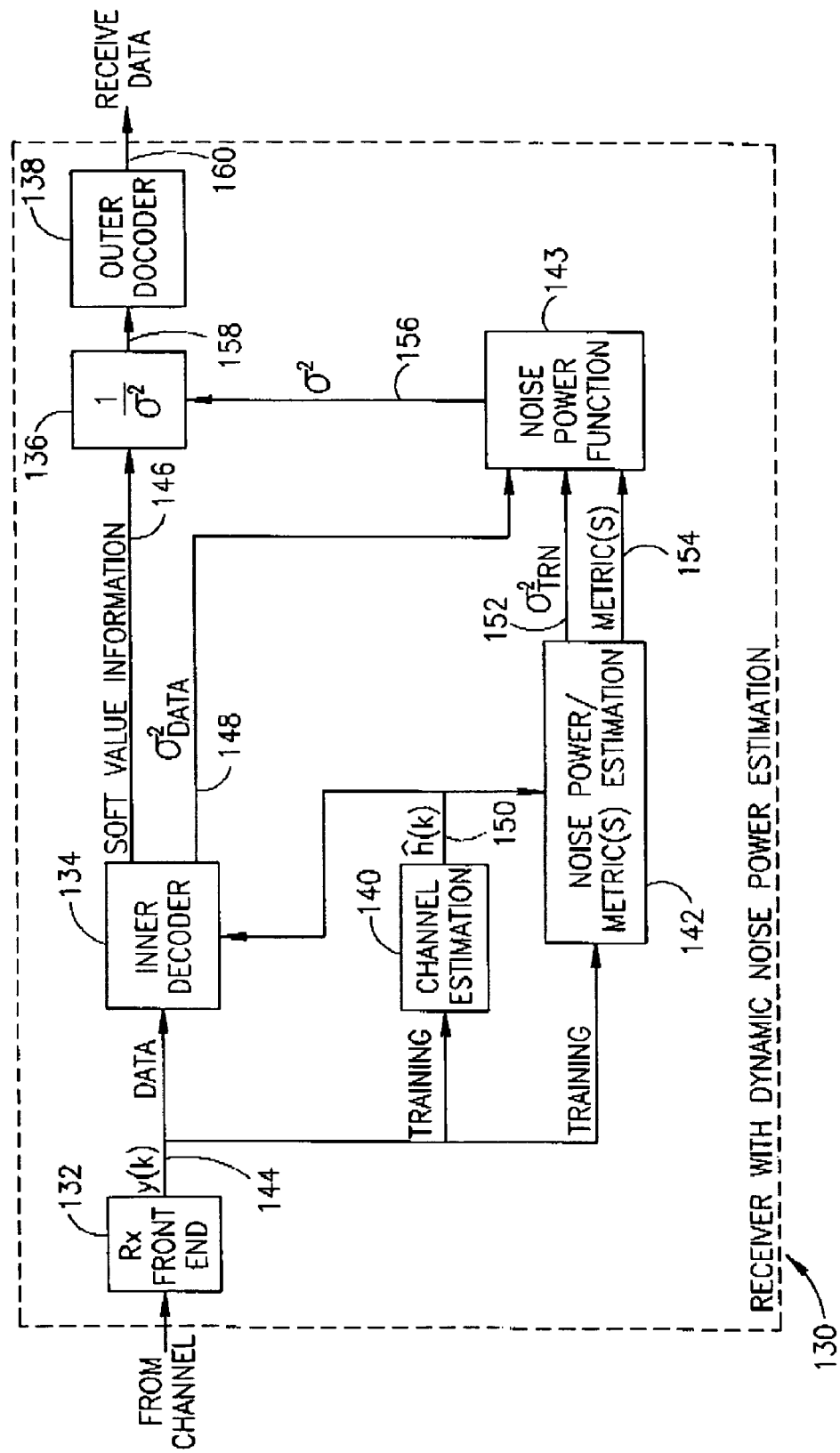
FIG. 6 is a block diagram illustrating an example receiver with dynamic noise power estimation constructed in accordance with the present invention.

An example receiver incorporating the normalization function of the present invention will now be described in more detail. A block diagram illustrating an example receiver with dynamic noise power estimation constructed in accordance with the present invention is shown in FIG. 6.

The receiver, generally referenced 130, comprises an Rx front end circuit 132, inner decoder 134, channel estimate 140, noise power/SNR estimation 142, noise power function block 143, normalization gain adjustment block 136 and an outer decoder 138.

The Rx front end 132 functions to generate samples y(k) 144 from the signal received from the channel. The data related received samples are input to the inner decoder 134 while the training sequence related received samples are input to the channel estimate 140 and the noise power/SNR estimation 142. The inner decoder comprises an equalizer adapted to output a noise power estimate 148 derived from the data in addition to soft decision information 146.

The channel estimation is operative to produce an estimate of the channel $\hat{h}(k)$ 150 as described supra. The channel estimate is used by both the inner decoder 134 and the noise power/SNR estimation block 142 which is operative to generate a noise power estimate $\hat{\sigma}_{TRN}^2$ 152 derived from the training sequence and one or more performance metrics 154. Examples of performance metrics suitable for use with the present invention include signal to noise ratio (SNR) and bit error rate (BER). It is appreciated that other suitable performance metrics may also be used.

The data derived noise power estimate 148, training sequence derived noise power estimate 152 and the one or more performance metrics 154 are input to a noise power function block 142 which is adapted to generate a final noise power estimate $\hat{\sigma}^2$ 156. The noise power estimation function may comprise any suitable function to determine the final noise power estimate.

Two function examples described in more detail hereinbelow include (1) a binary function, where either the training sequence or the data derived noise power estimate is used and (2) a weighted function where a weighted averaged combining both noise power estimates is used based on some performance metric criteria.

The final noise power estimate is used as the coefficient for the normalizing gain adjustment 136. The soft decision information 146 is multiplied by the final noise power estimate 156 to yield a normalized soft decision information 158 that is subsequently input to the outer decoder 138. The outer decoder 138 functions to generate the received binary output data 160.

In accordance with the present invention, the noise power estimate can be derived from the training sequence, the data itself or a combination of the two. To derive the noise power estimate from the data, the inner decoder (i.e. the equalizer) is adapted to provide a noise variance value. One possible method is to generate the noise variance value from the final metrics of the maximum likelihood (ML) path noise variance derived from the Viterbi Algorithm inner decoder, as expressed in Equation 9 below.

$$\hat{\sigma}_{Data}^2 = \|\hat{S}_{Data}(k) * \hat{h}(k) - y(k)\| = ML \text{ path metric} \quad (9)$$

where $$\|x\| = \frac{1}{K}\sum_{k}^{K} x_k * x_k^* \quad (10)$$

and $\hat{\sigma}_{DATA}^2$ is the noise power variance;

$\hat{S}_{Data}(i)$ is the $k^{th}$ symbol from the most likely sequence emerging from the Viterbi Algorithm equalizer;

$\hat{h}(k)$ is the channel estimate;

y(k) is the received data sequence;

Alternatively, the noise variance value can be generated from the hard decision error vector emerging from a symbol-by-symbol slicer coupled to the output of a soft output inner decoder (i.e. the equalizer), as expressed in Equation 11 below.

$$\hat{\sigma}_{DATA}^2 = \|\hat{S}_{DATA}(k)*\hat{h}(k)-y(k)\| \quad (11)$$

where $\hat{S}_{Data}(k)$ is the hard decision symbol, i.e. the symbol with the minimal Euclidian distance or the symbol most likely to have been transmitted.

In accordance with the invention, the noise variance is also determined using the training sequence transmitted along with the information in many of the communications protocols commonly used today. In GSM wireless systems, for example, a training sequence is transmitted within each burst as a midamble. In other protocol schemes, the training sequence may be transmitted as a preamble.

To determine the noise variance $\hat{\sigma}_{TRN}^2$, the received training sequence $y_{TRN}(k)$ is subtracted from the convolution of the ideal training sequence $S_{TRN}(k)$ and the channel estimate $\hat{h}(k)$ as expressed below $$\hat{\sigma}_{TRN}^2 = \|S_{TRN}(k)*\hat{h}(k)-y_{TRN}(k)\| \quad (12)$$

It is noted that in any general estimation process, the estimation of a parameter improves as the number of observations increases. In other words, the estimation variance becomes smaller as the input sequence grows longer. In the present estimation problem, the noise power is the unknown parameter. The process of estimating the noise power from the training sequence typically suffers from large estimation variance due to the relatively short training sequences used in most communication protocols.

Therefore, in general and assuming reliable equalizer decisions, better performance can be achieved by estimating the noise power suing the data portion of the received signal, rather than the training sequence. This is because using the data portion to estimate the noise yields a better (i.e. smaller) estimation variance due to the fact that the training sequence is shorter than the data part sequence. This can be expressed as $$VAR(\hat{\sigma}_{TRN}-\sigma) > VAR(\hat{\sigma}_{Data}-\sigma) \quad (13)$$

where
$\hat{\sigma}_{TRN}$ is the noise power estimation from the training part;
$\hat{\sigma}_{Data}$ is the noise power estimation from the data part;
$\sigma$ is the actual real noise power;

The above analysis is valid only in the case where there are relatively few decision errors made by the inner decoder (i.e. the equalizer) during the demodulation of the data portion of the received sequence. When the inner decoder does make large numbers of decision errors, the resultant noise power estimate, derived from the output of the inner decoder, suffers from incorrect decision biasing.

The present invention provides an alternative way to estimate the noise power. In accordance with the invention, the noise estimate may be determined using (1) the training sequence, (2) the inner decoder output in the data part or (3) a combination of the training sequence and the inner decoder output.

Figure 7:
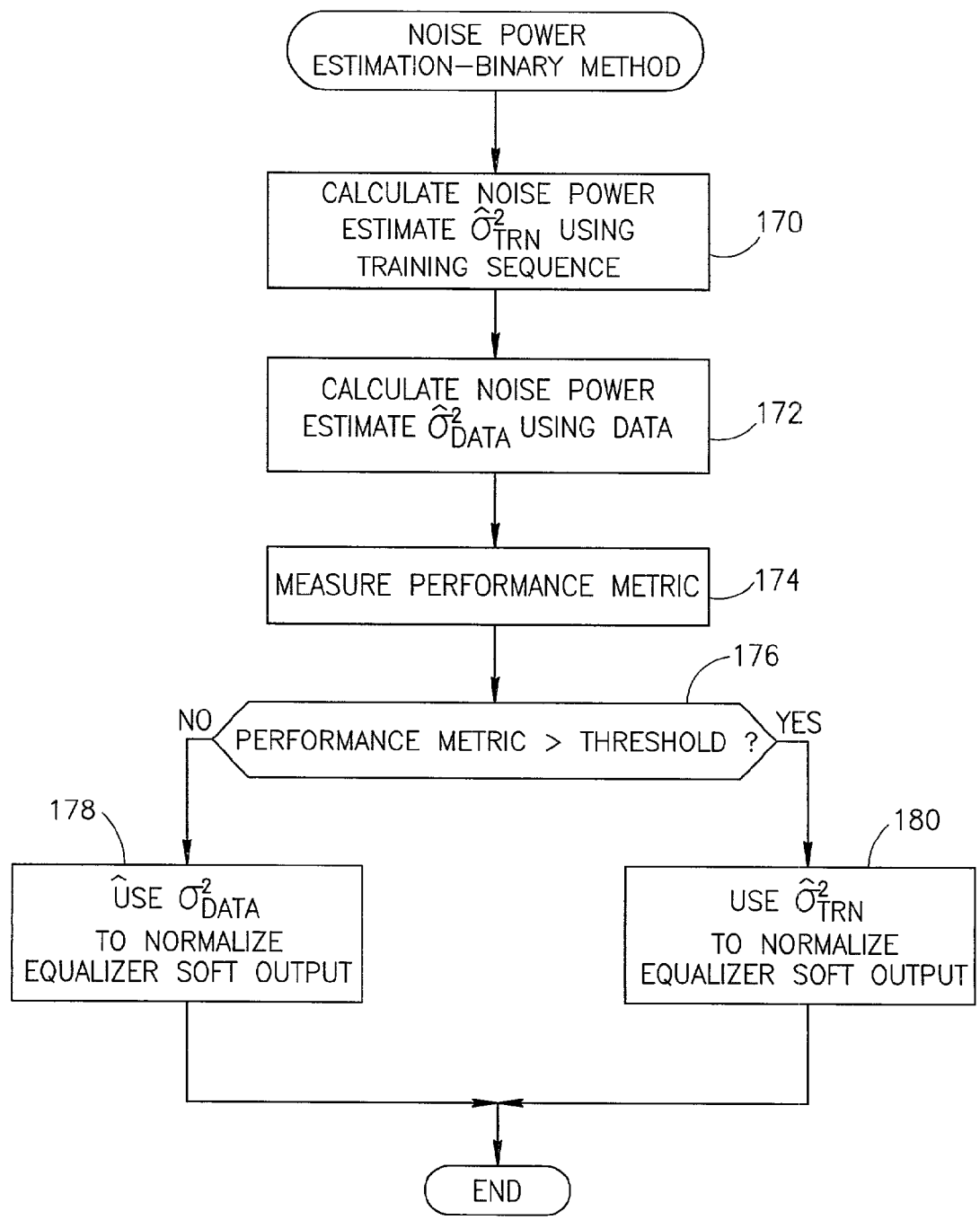
FIG. 7 is a flow diagram illustrating the binary embodiment of the noise power estimation method of the present invention.

A flow diagram illustrating the binary embodiment of the noise power estimation method of the present invention is shown in FIG. 7. The noise power estimate $\hat{\sigma}_{TRN}^2$ is calculated using the training sequence (step 170). This is performed by the noise power determination block 142 (FIG. 6). In addition, the noise power estimate $\hat{\sigma}_{DATA}^2$ is calculated using the output of the inner decoder derived from the data point (i.e. equalizer) (step 172). The inner decoder is adapted to output either the final metrics of the maximum likelihood path noise variance derived from the Viterbi equalizer or the error vector from a symbol to symbol slicer.

The particular performance metric is then measured (step 174). The measurement of the performance metric is intended to provide an indication of the number of errors generated by the inner decoder. For example, the performance metric may comprise the SNR or BER of the received signal. Depending on the type of metric used, if the performance metric exceeds a predetermined threshold (step 176), indicating that the inner decoder is generating too many errors, the noise power estimate $\hat{\sigma}_{TRN}^2$ derived from the training sequence is used to normalize the soft decision output of the equalizer (step 180).

Conversely, if the performance metric indicates that the error rate of the inner decoder is below a threshold (step 176), the noise power estimate $\hat{\sigma}_{DATA}^2$ derived from the data portion is used to normalize the soft decision output of the equalizer step (step 178).

Figure 8:
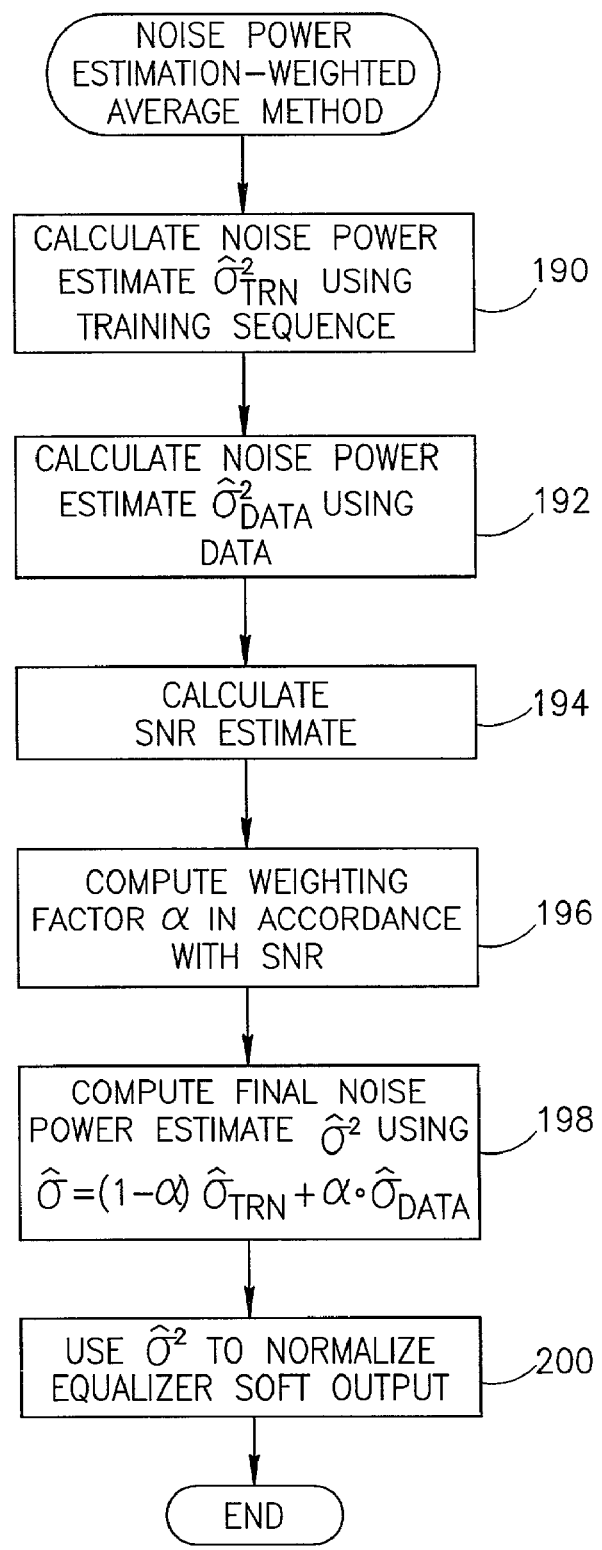
FIG. 8 is a flow diagram illustrating the weighted average embodiment of the noise power estimation method of the present invention.

In an alternative method, the two types of noise power estimates are combined in a weighted average. A flow diagram illustrating the weighted average embodiment of the noise power estimation method of the present invention is shown in FIG. 8. The noise power estimate $\hat{\sigma}_{TRN}^2$ is calculated using the training sequence (step 190). In addition, the noise power estimate $\hat{\sigma}_{DATA}^2$ is calculated using the output of the inner decoder derived from the data portion (i.e. equalizer) (step 192). The inner decoder is adapted to output either the final metrics of the maximum likelihood path noise variance derived from the Viterbi equalizer or the error vector from a symbol to symbol slicer.

The particular performance metric is the measured (step 194). In this example embodiment, the SNR is used as the performance metric, although other metrics may also be suitable. The measurement of the SNR performance metric is intended to provide an indication of the number of errors generated by the inner decoder. The weighting factor $\alpha$ is then calculated (step 196).

The final noise power estimate $\hat{\sigma}$ is then calculated using the following expression (step 198).

$$\hat{\sigma} = (1-\alpha)*\hat{\sigma}_{TRN} + \alpha*\hat{\sigma}_{Data} \quad (14)$$

where
$\hat{\sigma}$ is the final noise power estimation;
the range for $\alpha$ is $0<\alpha<1$;

The final noise estimate is then used to normalize the soft decision output of the equalizer (step 200).

Note that any suitable type of weighting may be used with Equation 14, e.g., smooth or binary $\alpha$. Using either 0 or 1 for the weight is equivalent to the binary method described above in connection with FIG. 7. Binary weighting may be used, for example, when the noise power estimate derived from the training sequence indicates that the noise power is very close to the $d_{min}$ of the received signal constellation. In this case, the final noise power estimate should be derived solely from the training sequence. Otherwise, the data derived noise power estimate is used.

In the example presented above, the final noise power estimate is determined from a weighted average of both the training sequence estimation and the data. The weighting factor is calculated as a function of the SNR. If the SNR is less than a predetermined threshold, a weighting factor $\alpha=0$ is used. If the SNR equals or exceeds the threshold, the weighting factor $\alpha$ is set to ½. Thus, during periods where the SNR is low, the noise power estimate is derived from the training sequence and not the data portion since the data derived noise power estimate suffers from biasing from wrong equalizer decisions.

Alternatively, a smooth weighting factor can be used whereby the weighting factor is determined as a function of the performance metric. For example, the SNR is used to calculate the weight factor according to the following function $$0<(\alpha=k^*SNR)<\tfrac{1}{2} \quad (15)$$

where k is a constant factor.

GSM EDGE Embodiment

Figure 9:
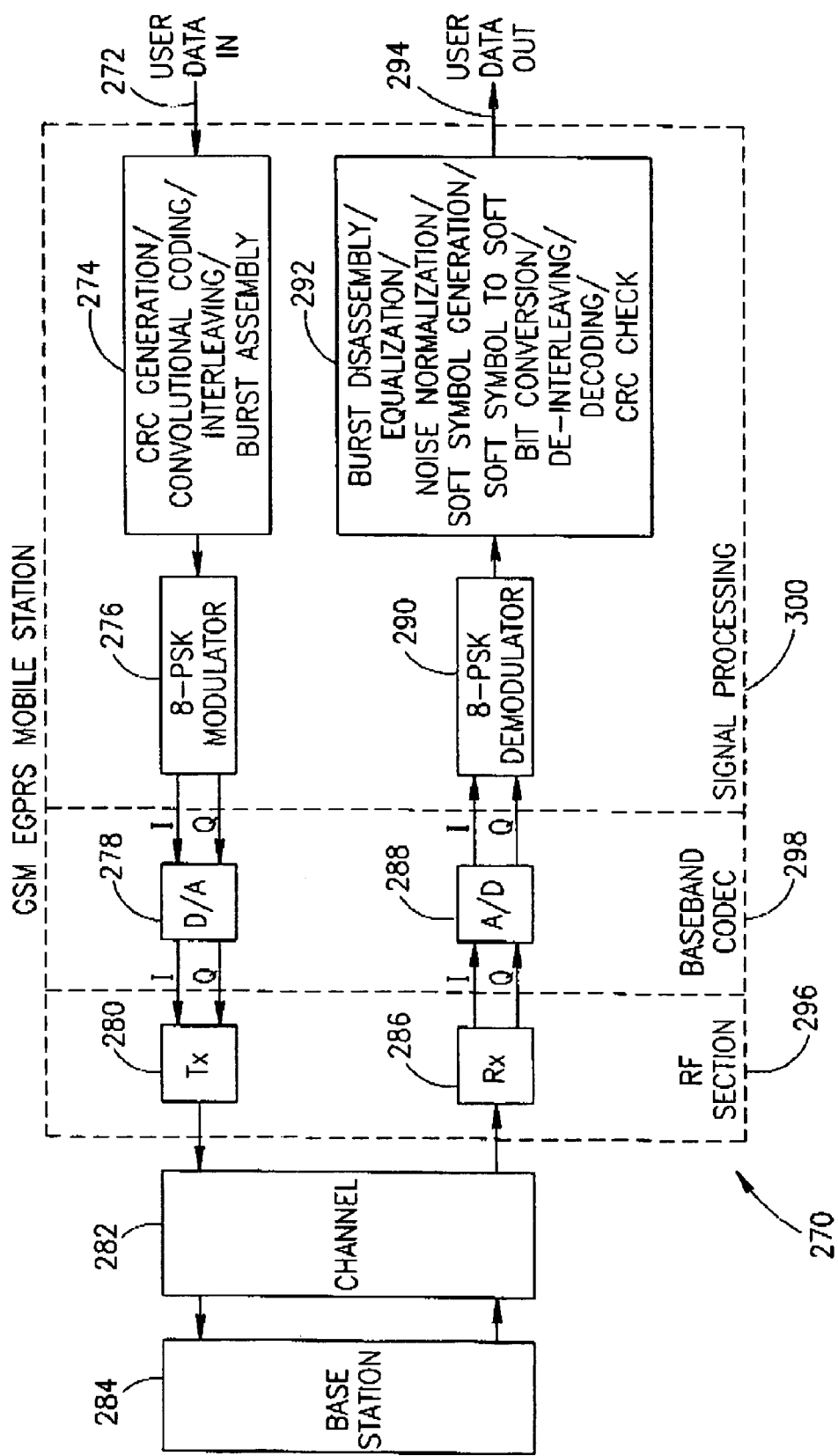
FIG. 9 is a block diagram illustrating the functional processing blocks in a GSM EGPRS mobile station.

A GSM EGPRS mobile station constructed to comprise means for performing the noise normalization method of the present invention is presented. A block diagram illustrating the functional processing blocks in a GSM EGPRS mobile radio station is shown in FIG. 9. The radio station is designed to provide reliable data communications at rates of up to 384 kbit/s. The GSM EGPRS mobile station, generally referenced 270, comprises a transmitter and receiver divided into the following sections: signal processing circuitry 300, baseband codec 298 and RF circuitry section 296.

In the transmit direction, the signal processing portion functions to protect the data so as to provide reliable communications from the transmitter to the base station 284 over the channel 282. Several processes performed by the channel coding block 274 are used to protect the user data 272 including cyclic redundancy code (CRC) check, convolutional coding, interleaving and burst assembly. The resultant data is assembled into bursts whereby guard and trail symbols are added in addition to a training sequence midamble that is added to the middle of burst. Note that both the user data and the signaling information go through similar processing. The assembled burst is then modulated by a modulator 276 which may be implemented as a 3π/8 offset 8-PSK modulator.

In the receive direction, the output of the baseband codec is demodulated using a complementary 8-PSK demodulator 290. Several processes performed by the channel decoding block 292 in the signal processing section are then applied to the demodulated output to generate user data 294. The processes performed include burst disassembly, equalization, noise normalization in accordance with the present invention, soft symbol generation, soft symbol to soft bit conversion, de-interleaving, convolutional decoding and CRC check.

The baseband codec converts the transmit and receive data into analog and digital signals, respectively, via D/A converter 278 and A/D converter 288. The transmit D/A converter provides analog baseband I and Q signals to the transmitter 280 in the RF circuitry section. The I and Q signals are used to modulate the carrier for transmission over the channel.

In the receive direction, the signal transmitted by the base station over the channel is received by the receiver circuitry 286. The analog signals I and Q output from the receiver are converted back into a digital data stream via the A/D converter. This I and Q digital data stream is filtered and demodulated by the 8-PSK demodulator before being input to the channel decoding block 292. Several processes performed by the signal processing block are then applied to the demodulated output.

In addition, the mobile station performs other functions that may be considered higher level such as synchronization, frequency and time acquisition and tracking, monitoring, measurements of received signal strength and control of the radio. Other functions include handling the user interface, signaling between the mobile station and the network, the SIM interface, etc.

Simulation Results

To illustrate the benefits of the noise normalization method of the present invention, a GSM Enhanced General Packet Radio System (EGPRS) was simulated and the results are presented herein. The simulation was performed assuming the MCS5 coding scheme, a typical urban channel for a mobile unit moving at a velocity of 50 km/h (TU50), a 900 MHz frequency band, with frequency hopping and with the addition of adjacent channel interferer.

Figure 10:
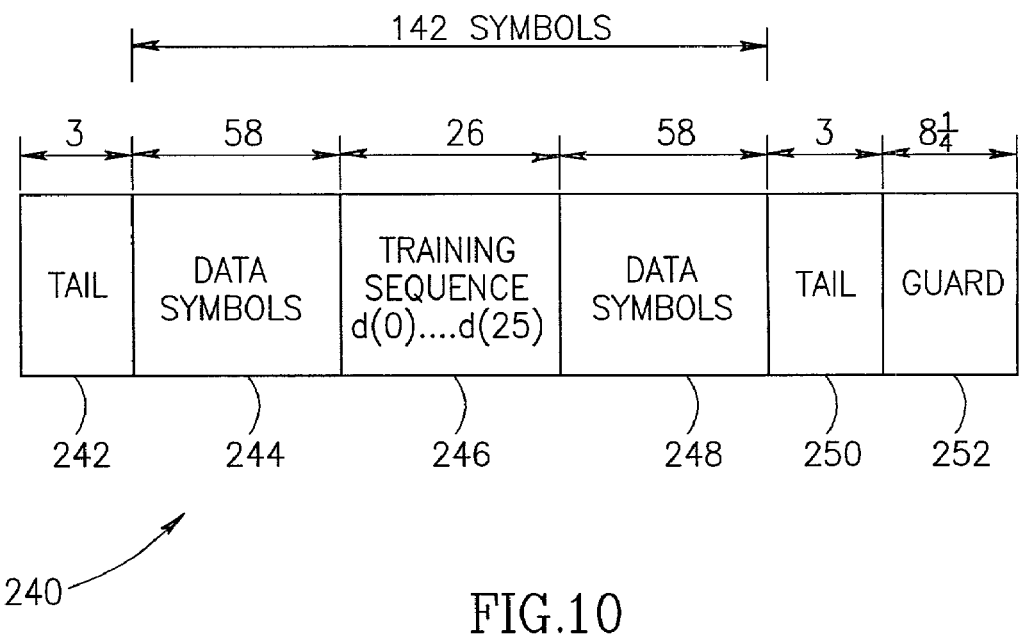
FIG. 10 is a diagram illustrating the elements of a GSM burst including tail, data and training symbols.

The EGPRS system is a Time Division Multiple Access (TDMA) system wherein eight users are able to share the same carrier frequency. In an EGPRS transmitter, the data bits are encoded with a rate ⅓ convolutional encoder, interleaved and mapped to 8-ary symbols. The resultant coded data symbols together with the training sequence are assembled into a burst of 142 symbols as shown in FIG. 10.

In GSM, the training sequence is sent in the middle of each burst. Each fixed length burst 240 consists of 142 symbols preceded by a 3 symbol tail 242 and followed by a 3 symbol tail 250 and 8.25 symbol guard 252. The 142 symbols include a 58 symbol data portion 244, 26 symbol training sequence 246 and another 58 symbol data portion 248. Since the training sequence is sent in the middle of the burst, it is referred to as a midamble. It is inserted in the middle of the burst in order to minimize the maximum distance to a data symbol thus minimizing the time varying effects at the ends of the burst.

The burst is then modulated using 3π/8-offset 8-PSK with Gaussian pulse shaping in accordance with the GSM standard. The modulate output is transmitted over a frequency selective static Gaussian channel utilizing punctured rate ⅓ convolutional coding. An MLSE type equalizer with a Least Squares type channel estimator was used in the receiver. The receiver was adapted to generate soft decision information using a hard decision equalizer in combination with a soft output generator. A Viterbi Algorithm based convolutional decoder was used as the outer decoder. The soft decision outputs were used as input for the soft decoding.

Figure 11:
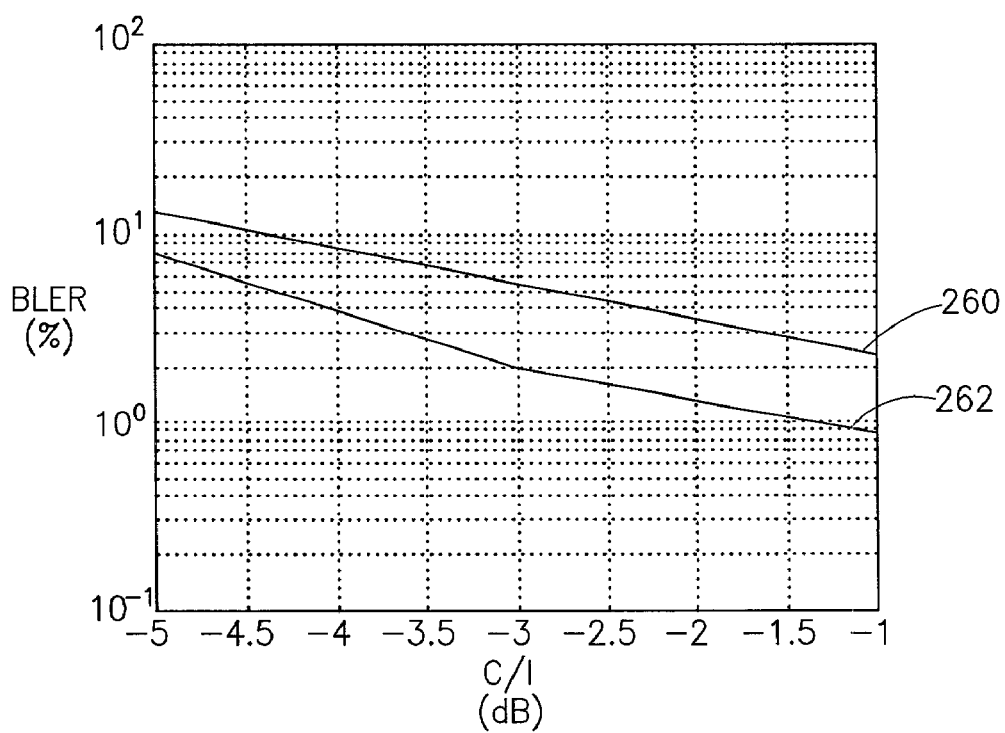
FIG. 11 is a graph illustrating Block Error Rate (BLER) at the output of the user decoder versus Channel to Interferer ratio (C/I) for a communications receiver constructed with and without the soft decision normalization of the present invention.

A graph illustrating Block Error Rate (BLER) at the output of the outer decoder versus Channel to Interferer ratio (C/I) for a communications receiver constructed with and without the soft decision normalization of the present invention is shown in FIG. 11. The curve 262 represents the BLER at the output of the outer decoder, where the decoder uses normalized soft values. The binary α weighting factor type of normalization described above was used to normalize the soft decision equalizer output. The curve 260 represents the BLER versus C/I where the decoder uses non-normalized soft values. It can be seen that performance gains of several dBs can be achieved using the present invention when compared to non-normalized soft value decoding. For example, at a BLER of 1.5%, a performance gain of approximately 2.0 dB is achieved using the normalization method of the present invention.

Computer Embodiment

Figure 12:
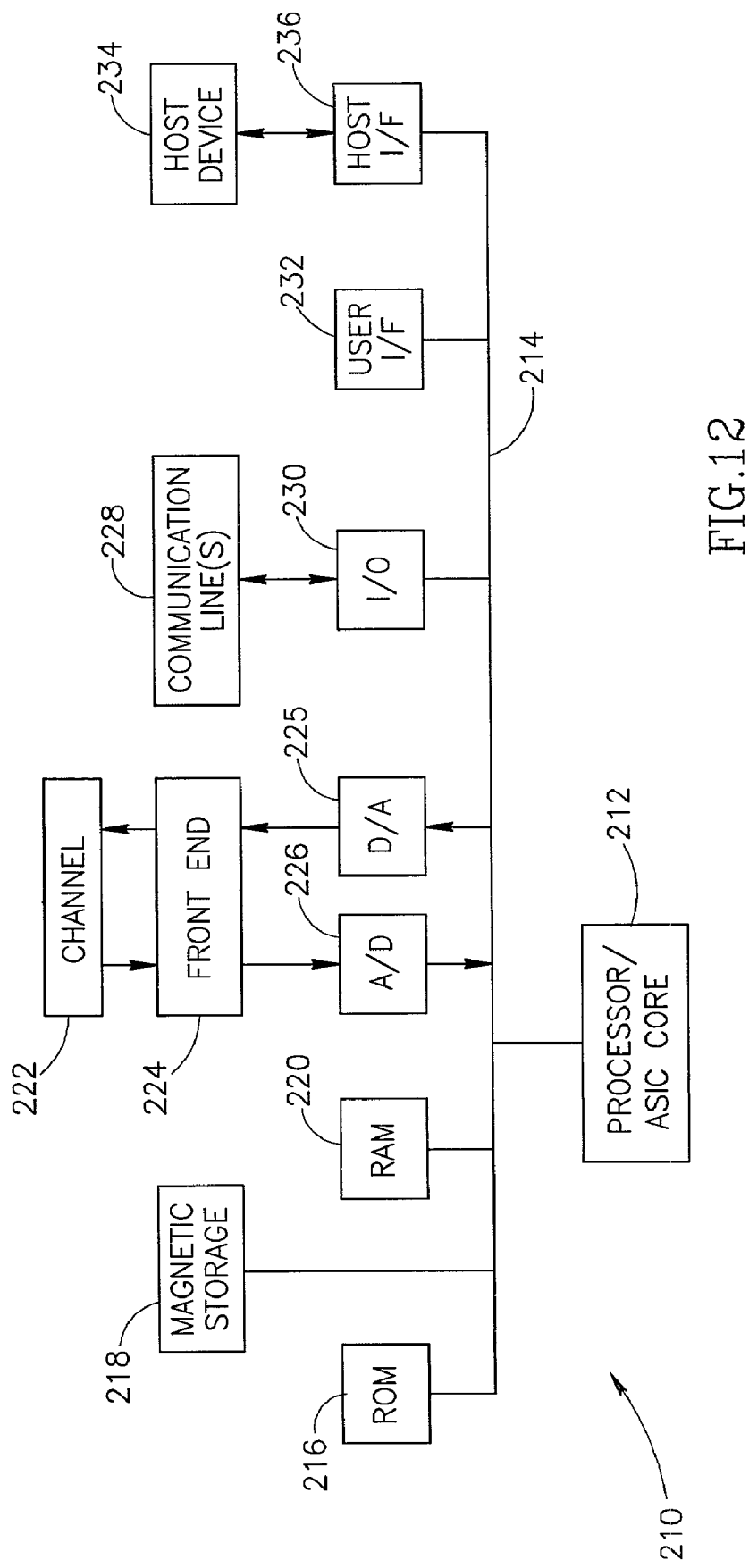
FIG. 12 is a block diagram illustrating an example computer processing system adapted to perform the soft output generator method of the present invention.

In another embodiment, a computer is operative to execute software adapted to perform the noise normalization method of the present invention. A block diagram illustrating an example computer processing system adapted to perform the noise normalization method of the present invention is shown in FIG. 12. The system may be incorporated within a communications device such as a receiver or transceiver, part of which is implemented in software.

The computer system, generally referenced 210, comprises a processor 212 which may be implemented as a microcontroller, microprocessor, microcomputer, ASIC core, central processing unit (CPU) or digital signal processor (DSP). The system further comprises static read only memory 216 and dynamic main memory 220 all in communication with the processor. The processor is also in communication, via a bus 214, with a number of peripheral devices that are also included in the computer system. An A/D converter 226 functions to sample the baseband signal output of the front end circuit 224 coupled to the channel 222. Samples generated by the processor are input to the front end circuit via D/A converter 225. The front end circuit comprises RF circuitry, including receiver, transmitter and channel coupling circuitry.

One or more communication lines 228 are connected to the system via I/O interface 230. A user interface 232 responds to user inputs and provides feedback and other status information. A host interface 236 connects a host device 234 to the system. The host is adapted to configure, control and maintain the operation of the system. The system also comprises magnetic storage device 218 for storing application programs and data. The system comprises computer readable storage medium which may include any suitable memory means including but not limited to magnetic storage, optical storage, semiconductor volatile or non-volatile memory, biological memory devices, or any other memory storage device.

The noise normalization method software is adapted to reside on a computer readable medium, such as a magnetic disk within a disk drive unit. Alternatively, the computer readable medium may comprise a floppy disk. Flash memory card, EEPROM based memory, bubble memory storage, ROM storage, etc. The software adapted to perform the noise normalization method of the present invention may also reside, in whole or in part, in the static or dynamic main memories or in firmware within the processor of the computer system (i.e. within microcontroller, microprocessor, microcomputer, DSP, etc. internal memory).

In alternative embodiments, the method of the present invention may be applicable to implementations of the invention in integrated circuits, field programmable gate arrays (FPGAs), chip sets or application specific integrated circuits (ASICs), wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of normalizing soft decisions obtained from an M-ary signal transmitted over a communications channels and subsequently input to an outer decoder, said method comprising the steps of:

generating a first noise power estimate based on a training sequence transmitted along with data over said communications channel;

generating a second noise power estimate derived from the data transmitted over said communications channel;

generating at least one performance based metric based on the reception of said training sequence or on the reception of said data;

calculating a combined noise power estimate as a function of said first noise power estimate, said second noise power estimation and said at least one performance based metric; and modifying said soft decisions in accordance with said combined noise power estimate so as to yield normalized soft decisions, said normalized soft decisions subsequently input to said outer decoder.

2. The method of according to claim 1, wherein said at least one performance metric comprises Signal to Noise Ratio (SNR).

3. The method according to claim 1, wherein said at least one performance metric comprises Bit Error Rate (BER).

4. The method according to claim 1, wherein said first noise power estimate is derived from an ideal training sequence, a received training sequence and a channel estimate.

5. The method according to claim 1, wherein said first noise power estimate is derived from an ideal training sequence, a received training sequence and a channel estimate in accordance with the following expression $$\hat{\sigma}_{TRN}^2 = \|S_{TRN}(k) + \hat{h}(k) - y_{TRN}(k)\|$$

where $\hat{\sigma}_{TRN}^2$ is the first noise power estimation, $S_{TRN}(k)$ is the ideal training sequence, $\hat{h}(k)$ is the channel estimate, $y_{TRN}(k)$ is the received data sequence, k is a discrete time index, the symbol * represents the convolution operation, the operation $\|x\|$ is defined as the sum of squares of a vector x with components $x_k$ as follows $$\|x\| = \frac{1}{K} \sum_{k}^{K} x_k * x_k^*$$

where K is the length of vector x and $x_k'$ is the complex conjugate of $x_k$.

6. The method according to claim 1, wherein said second noise power estimate is derived from maximum likelihood path metrics generated by a Viterbi Algorithm based inner decoder, a received symbol sequence and a channel estimate in accordance with the following expression $$\hat{\sigma}_{DATA}^2 = \|\hat{S}_{DATA}(k) * \hat{h}(k) y(k)\|$$

where $\hat{\sigma}_{DATA}^2$ is the second notes power estimation, $\hat{S}_{Data}(k)$ is $k^{th}$ symbol from the most likely sequence emerging from the Viterbi Algorithm based inner decoder, $\hat{h}(k)$ is the channel estimate, y(k) is the received training sequence, k is a discrete time index, the symbol * represents the convolution operation, the operation $\|x\|$ is defined as the sum of squares of a vector x with components $x_k$ as follows $$\|x\| = \frac{1}{K} \sum_{k}^{K} x_k * x_k^*$$

where K is the length of vector x and $x_k^*$ is the complex conjugate of $x_k$.

7. The method according to claim 1, wherein said second noise power estimate is derived from hard decision error vectors generated by a symbol slicer at the output of an inner decoder, a received symbol sequence and a channel estimate in accordance with the following expression $$\hat{\sigma}_{DATA} = \|\hat{S}_{DATA}(k) * \hat{h}(k) - y(k)\|$$

where $\hat{\sigma}_{DATA}^2$ is the second noise power estimation, $\hat{S}_{DATA}(k)$ is the hard decision symbol most likely to have been transmitted, $\hat{h}(k)$ is the channel estimate, $y(k)$ is the received data sequence k is a discrete time index, the symbol * represents the convolution operation, the operator $\|x\|$ is defined as the sum of squares of a vector x with components $x_k$ as follows $$\|x\| = \frac{1}{K}\sum_{k}^{K} x_k * x_k^*$$

where K is the length of vector x and $x_k^*$ is the complex conjugate of $x_k$.

8. The method according to claim 1, wherein said combined noise power estimate is calculated based solely on said first noise estimate in the event said at least one performance metric indicates the variance of said second noise power estimate exceeds that of said first noise power estimate.

9. The method according to claim 1, wherein said combined noise power estimate is calculated based solely on said first noise power estimate in the event said at least one performance metric exceeds a predetermined threshold.

10. The method according to claim 1, wherein said combined noise power estimate is calculated based solely on said second noise power estimate in the event said at least one performance metric indicates the variance of said first noise power estimate exceeds that of said second noise power estimate.

11. The method according to claim 1, wherein said combined noise power estimate is calculated based solely on said second noise power estimate in the event said at least one performance metric exceeds a predetermined threshold.

12. The method according to claim 1, wherein said combined noise power estimate is calculated based on a weighted average of said first noise power estimate and said second noise power estimate.

13. The method according to claim 1, wherein said combined noise power estimate is calculated based on a weighted average of said first noise power estimate and said second noise power estimate in accordance with the following expression $$\hat{\sigma} = (1-\alpha) * \hat{\sigma}_{TRN} + \alpha * \hat{\sigma}_{DATA}$$

where
$\hat{\sigma}$ is the combined noise power estimation;
$\alpha$ is the weighting factor, $0<\alpha<1$;
$\hat{\sigma}_{TRN}$ is said first noise power estimation; and
$\hat{\sigma}_{DATA}$ is said second noise power estimation.

14. The method according to claim 13, wherein the weighting factor is calculated in accordance with the following $$0 < (\alpha = k * SNR) < \tfrac{1}{2}$$

where k is a constant factor and SNR is the Signal to Noise Ratio.

15. The method according to claim 1, wherein said step of modifying said soft decisions comprises multiplying said soft decisions by said combined noise power estimate to yield normalized soft decisions.

16. The method according to claim 1, wherein said soft decisions are generated by a soft output equalizer.

17. The method according to claim 1, wherein said soft decisions are generated by a combination of hard decision equalizer and soft output generator.

18. The method according to claim 1, wherein said outer decoder comprises a soft input Viterbi Algorithm based convolutional decoder.

19. A method of normalizing soft decisions obtained from an M-ary signal transmitted over a communications channel and subsequently input to an outer decoder, said method comprising the steps of:
generating a first noise power estimate based on a training sequence transmitted along with data over said communications channel;
generating a second noise power estimate derived from the data transmitted over said communications channel;
generating at least one performance based metric based on the reception of said training sequence or on the reception of said data;
calculating a combined noise power estimate solely as a function of said first noise power estimate when said at least one performance metric indicates said first noise power estimate has smaller estimation variance over said second noise power estimate;
calculating said combined noise power estimate solely as a function of said second noise power estimate when said at least one performance metric indicates said second noise power estimate has smaller estimation variance over said first noise power estimate;
modifying said soft decisions in accordance with said combined noise power estimate so as to yield normalized soft decisions, said normalized soft decisions subsequently input to said outer decoder.

20. The method according to claim 19, wherein said at least one performance metric comprises Signal to Noise Ratio (SNR).

21. The method according to claim 19, wherein said at least one performance metric comprises Bit Error Rate (BER).

22. The method according to claim 19, wherein said first noise power estimate is derived from an ideal training sequence, a received training sequence and a channel estimate.

23. The method according to claim 19, wherein said first noise power estimate is derived from an ideal training sequence, a received training sequence and a channel estimate in accordance with the following expression $$\hat{\sigma}_{TRN}^2 = \|S_{TRN}(k) * \hat{h}(k) - y_{TRN}(k)\|$$

where $\hat{\sigma}_{TRN}^2$ is the first noise power estimation, $S_{TRN}(k)$ is the ideal training sequence, $\hat{h}(k)$ is the channel estimate, $y_{TRN}(k)$ is the received data sequence, k is a discrete time index, the symbol * represents the convolution operation, the operator $\|x\|$ is defined as the sum of squares of a vector x with components $x_k$ as follows $$\|x\| = \frac{1}{K}\sum_{k}^{K} x_k * x_k^*$$

where K is the length of vector x and $x_k^*$ is the complex conjugate of $x_k$.

24. The method according to claim 19, wherein said second noise power estimate is derived from maximum likelihood path metrics generated by a Viterbi Algorithm based inner decoder, a received symbol sequence and a channel estimate in accordance with the following expression $$\hat{\sigma}_{DATA}^2 = \|\hat{S}_{DATA}(k) * \hat{h}(k) - y(k)\|$$

where $\hat{\sigma}_{DATA}^2$ is the second noise power estimation, $\hat{S}_{Data}(k)$ is $k^{th}$ symbol from the most likely sequence emerging from the Viterbi Algorithm based inner decoder, $\hat{h}(k)$ is the channel estimate, $y(k)$ is the received training sequence, k is a discrete time index, the symbol * represents the convolution operation, the operator $\|x\|$ is defined as the sum of squares of a vector x with components $x_k$ as follows $$\|x\| = \frac{1}{K}\sum_{k}^{K} x_k * x_k^*$$

where K is the length of vector x and $x_k^*$ is the complex conjugate of $x_k$.

25. The method according to claim 19, wherein said second noise power estimate is derived from hard decision error vectors generated by a symbol slicer at the output of an inner decoder, a received symbol sequence and a channel estimate in accordance with the following expression $$\hat{\sigma}_{DATA}^2 = \|\hat{S}_{DATA}(k) * \hat{h}(k) - y(k)\|$$

where $\hat{\sigma}_{DATA}^2$ is the second noise power estimation, $\hat{S}_{Data}(k)$ is the hard decision symbol most likely to have been transmitted, $\hat{h}(k)$ is the channel estimate, $y(k)$ is the received data sequence k is a discrete time index, the symbol * represents the convolution operation, the operator $\|x\|$ is defined as the sum of squares of a vector x with components $x_k$ as follows $$\|x\| = \frac{1}{K}\sum_{k}^{K} x_k * x_k^*$$

where K is the length of vector x and $x_k^*$ is the complex conjugate of $x_k$.

26. A method of normalizing soft decisions obtained from an M-ary signal transmitted over a communications channel and subsequently input to an outer decoder, said method comprising the steps of:
generating a first noise power estimate based on a training sequence transmitted along with data over said communications channel;
generating a second noise power estimate derived from the data transmitted over said channel;
generating at least one performance based metric based on the reception of said training sequence or on the reception of said data;
calculating a combined noise power estimate as a weighted function of said first noise power estimate and said second noise power estimate;
modifying said soft decisions in accordance with said combined noise power estimate so as to yield normalized soft decisions, said normalized soft decisions subsequently input to said outer decoder.

27. The method according to claim 26, wherein said weighted function is calculated in accordance with the following expression $$\hat{\sigma} = (1-\alpha) * \hat{\sigma}_{FHN} + \alpha * \hat{\sigma}_{Data}$$

where
$\hat{\sigma}$ is the combined noise power estimation;
$\alpha$ is the weighting factor, $0 < \alpha < 1$;
$\hat{\sigma}_{TRN}$ is said first noise power estimation; and
$\hat{\sigma}_{Data}$ is said second noise power estimation.

28. The method according to claim 27, wherein the weighting factor is calculated in accordance with the following $$0 < (\alpha = k * SNR) < \frac{1}{2}$$

where k is a constant factor and SNR is the Signal to Noise Ratio.

29. The method according to claim 26, wherein said at least one performance metric comprises Signal to Noise Ratio (SNR).

30. The method according to claim 26, wherein said at least one performance metric comprises Bit Error Rate (BER).

31. The method according to claim 26, wherein said first noise power estimate is derived from an ideal training sequence, a received training sequence and a channel estimate.

32. The method according to claim 26, wherein said first noise power estimate is derived from an ideal training sequence, a received training sequence and a chamber estimate in accordance with the following expression $$\hat{\sigma}_{TRN}^2 = \|S_{TRN}(k) * \hat{h}(k) - y_{TRN}(k)\|$$

where $\hat{\sigma}_{TRN}^2$ is the first noise power estimation, $S_{TRN}(k)$ is the ideal training sequence, $\hat{h}(k)$ is the channel estimate, $y_{TRN}(k)$ is the received data sequence, k is a discrete time index, the symbol * represents the convolution operation, the operator $\|x\|$ is defined as the sum of square of a vector x with components $x_k$ as follows $$\|x\| = \frac{1}{K}\sum_{k}^{K} x_k * x_k^*$$

where K is the length of vector x and $x_k^*$ is the complex conjugate of $x_k$.

33. The method according to claim 26, wherein said second noise power estimate is derived from maximum likelihood path metrics generated by a Viterbi Algorithm based inner decoder, a received symbol sequence and a channel estimate in accordance with the following expression $$\hat{\sigma}_{DATA}^2 = \|\hat{S}_{DATA}(k) * \hat{h}(k) - y(k)\|$$

where $\hat{\sigma}_{DATA}^2$ is the second noise power estimation, $\hat{S}_{Data}(k)$ is $k^{th}$ symbol from the most likely sequence emerging from the Viterbi Algorithm based inner decoder, $\hat{h}(i)$ is the channel estimate, $y(k)$ is the received training sequence, k is a discrete time index, the symbol * represents the convolution operation, the operator $\|x\|$ is defined as the sum of squares of a vector x with components $x_k$ as follows $$\|x\| = \frac{1}{K}\sum_{k}^{K} x_k * x_k^*$$

where K is the length of vector x and $x_k^*$ is the complex conjugate of $x_k$.

34. The method according to claim 26, wherein said second noise power estimate is derived from hard decision error vectors generated by a symbol slicer at the output of an inner decoder, a received symbol sequence and a channel estimate in accordance with the following expression $$\hat{\sigma}_{DATA}^2 = \|\hat{S}_{DATA}(k) * \hat{h}(k) - y(k)\|$$

where $\hat{\sigma}_{DATA}^2$ is the second noise power estimation, $\hat{S}_{Data}(k)$ is the hard decision symbol most likely to have been transmitted, $\hat{h}(k)$ is the channel estimate, $y(k)$ is the received data sequence k is a discrete time index, the symbol * represents the convolution operation, the operator $\|x\|$ is defined as the sum of squares of a vector x with components $x_k$ as follows $$\|x\| = \frac{1}{K}\sum_{k}^{K} x_k * x_k^*$$

where K is the length of vector x and $x_k^*$ is the complex conjugate of $x_k$.

35. A communications receiver for receiving and decoding an M-ary transmitted signal, comprising:
  a radio frequency (RF) front end circuit for receiving and converting said M-ary transmitted signal to a baseband signal;
  a demodulator adapted to receive said baseband signal and to generate a received signal therefrom in accordance with the M-ary modulation scheme used to generate said M-ary transmitted signal;
  a first decoder operative to receive said received signal and to generate a sequence of soft symbol decisions therefrom;
  a normalization mechanism comprising processing means programmed to:
    generate a first noise power estimate based on a training sequence transmitted along with data over a communications channel;
    generate a second noise power estimate derived from the data transmitted over said communications channel;
    generate at least one performance based metric based on the reception of said training sequence or on the reception of said data;
    calculate a combined noise power estimate as a function of said first noise power estimate, said second noise power estimation and said at least one performance based metric;
    modify said soft symbol decisions in accordance with said combined noise power estimate so as to yield normalized soft decisions; and
  a second decoder adapted to receive said normalized soft decisions and to generate binary received data therefrom.

36. The receiver according to claim 35, further comprising a speech decoder operative to convert said binary receive data to an audible speech signal.

37. The receiver according to claim 35, further comprising circuit switch data means for converting said binary receiver data to a data stream.

38. The receiver according to claim 35, further comprising packet switch data means for converting said binary receive data to a data stream.

39. The receiver according to claim 35, wherein said communications receiver is adapted to receive and decode a Global System for Mobile Communication (GSM) Enhanced Data Rates for GSM Evolution (EDGE) signal.

40. The receiver according to claim 35, wherein said communications receiver is adapted to receive and decode a Global System for Mobile Communication (GSM) Enhanced Data Rates for GSM Evolution (EDGE) Radio Access Network (GERAN) system signal.

41. The receiver according to claim 35, wherein said second decoder comprises a convolution decoder based on the Viterbi Algorithm (VA).

42. The receiver according to claim 35, wherein said M-ary symbol comprises an 8-PSK symbol.

43. The receiver according to claim 35, wherein said first decoder comprises a maximum likelihood sequence estimation (MLSE) equalizer based on the Viterbi Algorithm (VA).

44. The receiver according to claim 35, wherein said first decoder comprises means for performing a sub-optimal complexity reduced maximum likelihood sequence estimate (MLSE) technique based on the Viterbi Algorithm (VA).

45. The receiver according to claim 35, wherein said first decoder comprises a hard decision symbol slicer in combination with a soft output generator.

46. The receiver according to claim 35, wherein said first decoder comprises a Decision Feedback Equalizer (DFE).

47. The receiver according to claim 35, wherein said first decoder comprises a linear type equalizer.

48. An electronic data storage media storing a computer program adapted to program a computer to execute the normalization mechanism process of claim 35.

49. A computer readable storage medium having a computer program embodied thereon for causing a suitably programmed system to normalize soft decisions output by an inner decoder by performing the following steps when such program is executed on said system:
  generating a first noise power estimate based on a training sequence transmitted along with data over communications channel;
  generating a second noise power estimate derived from the data transmitted over said communications channel;
  generating at least one performance based metric based on the reception of said training sequence or on the reception of said data;
  calculating a combined noise power estimate as a function of said first noise power estimate, said second noise power estimation and said at least one performance based metric; and
  modifying said soft decisions in accordance with said combined noise power estimate so as to yield normalized soft decisions, said normalized soft decisions subsequently input to said outer decoder.

50. The computer readable storage medium according to claim 49, wherein said at least one performance metric comprises Signal to Noise Ratio (SNR).

51. The computer readable storage medium according to claim 49, wherein said at least one performance metric comprises Bit Error Rate (BER).

52. The computer readable storage medium according to claim 49, wherein said first noise power estimate is derived from an ideal training sequence, a received training sequence and a channel estimate.

53. The computer readable storage medium according to claim 49, wherein said computer program is suitably programmed to derive said first noise power estimate from an ideal training sequence, a received training sequence and a channel estimate in accordance with the following expression $$\hat{\sigma}_{TRN}^2 = \|S_{TRN}(k)*\hat{h}(k)-y_{TRN}(k)\|$$

where $\hat{\sigma}_{TRN}^2$ is the first noise power estimation, $S_{TRN}(k)$ is the ideal training sequence, $\hat{h}(k)$ is the channel estimate, $y_{TRN}(k)$ is the received data sequence, k is a discrete time index, the symbol * represents the convolution operation $\|x\|$ is defined as the sum of squares of a vector x with component $x_k$ as follows $$\|x\| = \frac{1}{K}\sum_{k}^{K} x_k * x_k^*$$

wherein K is the length of vector x and $x_k^*$ is the complex conjugate of $x_k$.

54. The computer readable storage medium according to claim 49, wherein said computer program is suitably programmed to derive said second noise power estimate from maximum likelihood path metrics generated by a Viterbi Algorithm based inner decoder, a received symbol sequence and a channel estimate in accordance with the following expression $$\hat{\sigma}_{DATA}^2 = \|\hat{S}_{DATA}(k) * \hat{h}(k) - y(k)\|$$

where $\hat{\sigma}_{DATA}^2$ is the second noise power estimation, $\hat{S}_{DATA}(k)$ is $k^{th}$ symbol from the most likely sequence emerging from the Viterbi Algorithm based inner decoder, $\hat{h}(k)$ is the channel estimate, y(k) is the received training sequence, k is a discrete time index, the symbol * represents the convolution operation, the operator $\|x\|$ is defined as the sum of squares of a vector x with components $x_k$ as follows $$\|x\| = \frac{1}{K}\sum_{k}^{K} x_k * x_k^*$$

where K is the length of vector x and $x_k^*$ is the complex conjugate of $x_k$.

55. The computer readable storage medium according to claim 49, wherein said computer program is suitably programmed to derive said second noise power estimate from hard decision error vectors generated by a symbol slicer at the output of an inner decoder, a received symbol sequence and a channel estimate in accordance with the following expression $$\hat{\sigma}_{DATA}^2 = \|\hat{S}_{DATA}(k) * \hat{h}(k) - y(k)\|$$

where $\hat{\sigma}_{DATA}^2$ is the second noise power estimation, $\hat{S}_{Data}(k)$ is the hard decision symbol most likely to have been transmitted, $\hat{h}(k)$ is the channel estimate, y(k) is the received data sequence k is a discrete time index, the symbol * represents the convolution operation, the operator $\|x\|$ is defined as the sum of squares of a vector x with components $x_k$ as follows $$\|x\| = \frac{1}{K}\sum_{k}^{K} x_k * x_k^*$$

where K is the length of vector x and $x_k^*$ is the complex conjugate of $x_k$.

56. The computer readable storage medium according to claim 49, wherein said computer program is suitably programmed to calculate said combined noise power estimate based solely on said first noise estimate in the event said at least one performance metric indicates the variance of said second noise power estimate exceeds that of said first noise power estimate.

57. The computer readable storage medium according to claim 49, wherein said computer program is suitably programmed to calculate said combined noise power estimate based solely on said first noise power estimate in the event said at least one performance metric exceeds a predetermined threshold.

58. The computer readable storage medium according to claim 49, wherein said computer program is suitably programmed to calculate said combined noise power estimate based solely on said second noise power estimate in the event said at least one performance metric indicates the variance of said first noise power estimate exceeds that of said second noise power estimate.

59. The computer readable storage medium according to claim 49, wherein said computer program is suitably programmed to calculate said combined noise power estimate based solely on said second noise power estimate in the event said at least one performance metric exceeds a predetermined threshold.

60. The computer readable storage medium according to claim 49, wherein said computer program is suitably programmed to calculate said combined noise power estimate based on a weighted average of said first noise power estimate and said second noise power estimate.

61. The computer readable storage medium according to claim 49, wherein said computer program is suitably programmed in calculate said combined noise power estimate based on a weighted average of said first noise power estimate and said second noise power estimate in accordance with the following expression $$\hat{\sigma} = (1-\alpha)*\hat{\sigma}_{TRN} + \alpha*\hat{\sigma}_{Data}$$

where $\hat{\sigma}$ is the combined noise power estimation;

$\alpha$ is the weighting factor, $0<\alpha<1$;

$\hat{\sigma}_{TRN}$ is said first noise power estimation; and $\hat{\sigma}_{Data}$ is said second noise power estimation.

62. The computer readable storage medium according to claim 49, wherein said computer program is suitably programmed to calculate the weighting factor in accordance with the following $$0<(\alpha=k*SNR)<\tfrac{1}{2}$$

where k is a constant factor and SNR is the Signal to Noise Ratio.

63. The computer readable storage medium according to claim 49, wherein said computer program is suitably programmed to modify said soft decisions by multiplying said soft decisions by said combined noise power estimate to yield normalized soft decisions.

* * * * *